United States Patent [19]

Bartelloni

[11] Patent Number: 4,510,019
[45] Date of Patent: Apr. 9, 1985

[54] LATEX CONTAINING PAPERS

[75] Inventor: René Bartelloni, Bar Le Duc, France

[73] Assignee: Papeteries de Jeand'heurs, Bar Le Duc, France

[21] Appl. No.: 442,621

[22] Filed: Nov. 17, 1982

Related U.S. Application Data

[63] Continuation-in-part of Ser. No. 349,366, Feb. 16, 1982, Pat. No. 4,445,972, and a continuation-in-part of Ser. No. 397,195, Jul. 12, 1982, and Ser. No. 441,172, Nov. 12, 1982.

[30] Foreign Application Priority Data

| May 12, 1981 | [FR] | France | 81 09400 |
| Jan. 8, 1982 | [FR] | France | 82 00224 |
| Apr. 9, 1982 | [FR] | France | 82 06255 |

[51] Int. Cl.³ .............................................. D21H 5/12
[52] U.S. Cl. ..................... 162/141; 162/142; 162/144; 162/145; 162/166; 162/168.1; 162/169; 162/181.1; 162/183
[58] Field of Search ............ 162/169, 183, 145, 164.1, 162/164.3, 164.6, 170, 189, 191, 190, 166, 167, 168.1, 143, 181.2, 181.3, 181.1, 181.6, 181.8, 142, 144, 141, 147

[56] References Cited

U.S. PATENT DOCUMENTS

| 2,563,897 | 1/1952 | Wilson et al. | |
| 2,601,597 | 6/1952 | Daniel et al. | 162/164.3 |
| 2,657,991 | 11/1953 | Walsh et al. | 162/169 |
| 2,658,828 | 11/1953 | Pattilloch | 162/169 |
| 2,668,111 | 2/1954 | Lindquist | 162/169 |
| 2,694,633 | 11/1954 | Pattilloch | 162/169 |
| 2,745,744 | 5/1956 | Weidner et al. | 162/169 |
| 3,016,325 | 1/1962 | Pattilloch | 162/169 |
| 3,193,446 | 7/1965 | Eisenberg | 162/169 |
| 3,298,901 | 4/1966 | Piersol | 162/169 |
| 3,502,197 | 2/1970 | Crocker et al. | |
| 3,619,347 | 12/1971 | Ireland | |
| 3,644,251 | 2/1972 | Wilhelmi | 162/169 |
| 3,844,880 | 10/1974 | Meisel, Jr. et al. | |
| 3,873,411 | 12/1974 | Drelich et al. | |
| 3,875,097 | 12/1974 | Sedlak | |
| 3,902,958 | 1/1975 | Breen et al. | |
| 4,178,205 | 7/1979 | Wessling et al. | |
| 4,181,567 | 10/1979 | Riddell et al. | |
| 4,187,142 | 7/1979 | Pickelman et al. | |
| 4,189,345 | 12/1979 | Foster et al. | |
| 4,225,383 | 9/1980 | McReynolds | 162/145 |
| 4,274,916 | 6/1981 | Grose | 162/145 |

FOREIGN PATENT DOCUMENTS 450523  2/1957  Canada.

OTHER PUBLICATIONS

Chemical Abstracts, 93:30875(b) 1980.
Chemical Abstracts, 93:97293z (1980).
Alince et al., "Colloidal Aspects of the Retention of Positively Charged Additives", *TAPPI*, 61, 11, pp. 111–114, (Nov. 1978).
Abstract Bulletin of the Institute of Paper Chemistry, vol. 51, Sep. 1980, No. 3, Abstract 2678 (R).
Britt et al., "Absorption and Flocculation Mechanisms in Paper Stock Systems", *TAPPI*, 67, pp. 102–112, (Jul. 1977).

*Primary Examiner*—Peter Chin
*Attorney, Agent, or Firm*—Browdy and Neimark

[57] ABSTRACT

Polymer, co-polymer and/or elastomer containing paper is manufactured for a wide variety of end uses. The paper is remarkably homogeneous and retains its porosity even when it contains large quantities of polymer, co-polymer or elastomer. The latex and the fibrous slurry are mixed at the wet end in conjunction with a polyelectrolyte bridging agent, the bridging agent having a cationic charge and the latex and fibrous material having an anionic charge. In this way, the latex particles in their substantially original size become linked with the fibrous material by means of the intermediate bridging agent and without the latex undergoing any substantially coagulation or precipitation.

6 Claims, 3 Drawing Figures

FIG. 3
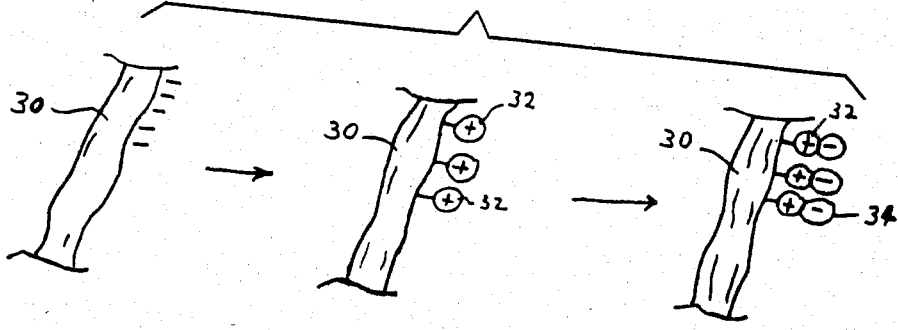
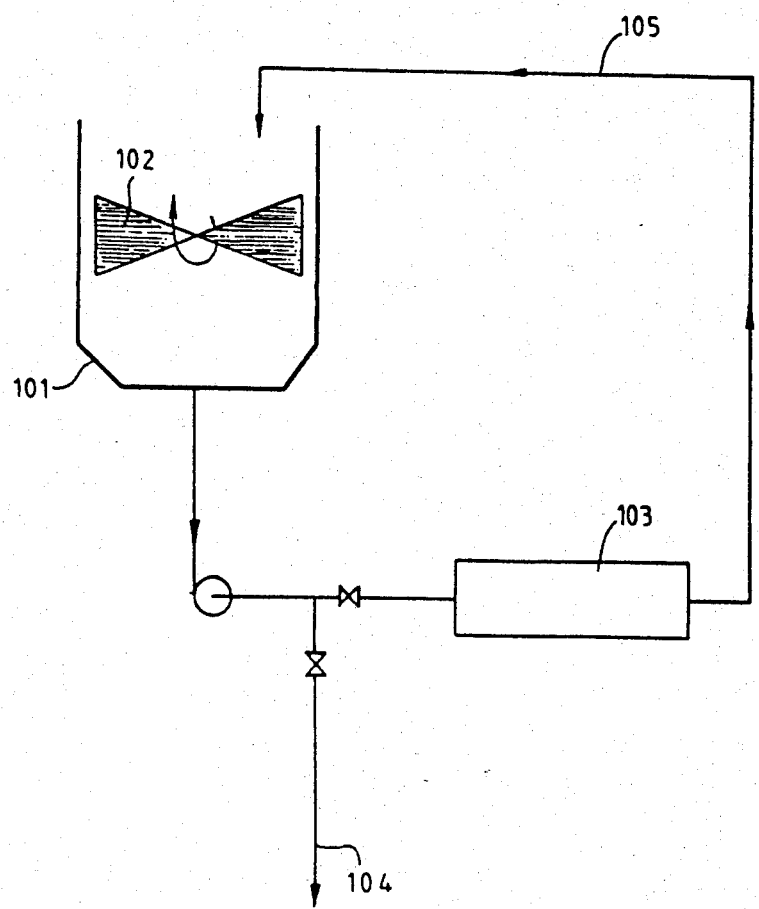
FIG. 2

LATEX CONTAINING PAPERS

This is a continuation-in-part of parent co-pending application Ser. No. 349,366 filed Feb. 16, 1982, now U.S. Pat. No. 4,445,972, and parent co-pending application Ser. No. 397,195, filed July 12, 1982, and Ser. No. 441,172 filed Nov. 12, 1982.

FIELD OF INVENTION

The present invention relates to novel, improved latex containing papers and, more particularly, to a wide variety of different types of papers containing varying quantities of latex, with or without optional materials such as fillers, resins, etc., having a wide variety of utilities, and to methods of making such papers.

BACKGROUND OF THE INVENTION

Demand for special papers has been increasing for many years. This is particularly true for water resistant papers intended for the manufacture of abrasive papers, adhesive papers, artificial leathers, construction and coating papers and boards, insulation, packing, etc. It is principally polymeric materials which confer on these special papers their impermeability, their flexibility and/or their resistance, and it is principally phenolic resins (phenoplasts) and amino resins (aminoplasts) which heretofore have permitted different appropriate coatings to be laid thereon which the manufacturers of these different special papers have required.

Thus, while the literature is rich with its disclosure of various methods for incorporating latex in the fibrous mixture fed into a paper machine, and such processes have been tested extensively for more than twenty years, the results obtained have never been satisfactory from the exploitation point of view and very many economic and technological difficulties remain unresolved, particularly when the proportion of latex attempted to be incorporated exceeds 7-10% of the fibrous mass. It is for these reasons that the technique of post-impregnation of the already fabricated paper sheet is currently and very widely used.

Accordingly, to produce these different special papers, the conventionally used procedure still remains the following: (1) A continuous sheet of paper is formed on a paper-making machine and is wound on a mandrel so as to form a reel; (2) the reel so obtained is then fed in a continuous length through another machine in one, two, three, or even more, passes for the purpose of depositing on one or both faces of the fibrous sheet materials different layers such as latex, resins, waxes, tars, etc. It is only then that the sheet, after appropriate drying, is again wound in a reel. Thus, in order to obtain the desired paper, it is necessary to repeat the winding and unwinding operations a plurality of times, applying each time a new coating. That obviously considerably increases the price of the product. Moreover, it is difficult to maintain porosity as well as the control of other physical properties, through the impregnation technique, and in addition undue quantities of impregnating media are used.

Returning to the many attempts over the past twenty years or more to make impregnated paper by the use of latex during the initial formation of the paper web, it has previously been the objective of workers in the field to cause the coagulation of the latex and its precipitation on the paper-making fibers. Unfortunately, when the latex coagulates it also deposits as beads on the paper-making wire and on the various tanks and other equipment, which rapidly makes further processing difficult if not impossible. This problem may also be due in part to the generally poor retention of the latex and other resins which may be used. Nevertheless, despite the expectation of a spectacular lowering of the cost if the latex or other additives could be added into the body of the pulp in the paper-making machine, this simplification of manufacture has not yet been successfully implemented commercially when it is desired to utilize more than about 7-10% of latex based on the fibrous mass, and accordingly recourse is almost invariably had to the difficult and costly process of post-impregnation. It is for these reasons that the technique of post-impregnation of the already fabricated sheet is currently and very widely used.

SUMMARY

It is, accordingly, an object of the invention to overcome the deficiencies of the prior art, such as indicated above.

It is another object to provide improved papers containing varying amounts of latex and which have improved properties, and which are simple and inexpensive to manufacture.

It is a further object to provide improved methods for the manufacturer of latex containing papers.

The present invention consequently has as an aim thereof to provide a new process for the continuous manufacture of fibrous materials containing latex, which answers better the requirements of practice than the previously known processes having the same aim, more especially in that it allows not only a whole series of coating steps to be avoided by manufacturing the paper from fibrous materials containing latex in the body thereof, but also a perfectly homogeneous paper is obtained, i.e. a paper more homogeneous and more even than that obtained by previously known processes.

In theory, it is known that particles having opposite electrostatic charges in an aqueous solution develop attractive hydrodynamic forces called Van der Waals forces, which can be controlled by an exact knowledge of the Zeta potential of the various particles in the aqueous solution. It thus possible, for example, to define the Zeta potential of an anionic particle in water and the Zeta potential of another positive particle in water. As a function of these respective values of Zeta potentials, it is possible to know the force and rapidity of attraction of these two particles when they are placed in each other's presence in the same mixture.

The present invention is based on the discovery of how to control the Van der Waals forces when an anionic latex is put into the presence of an anionic fibrous slurry, wherein the particles tend to repel one another. At that moment, in order to link the latex particles to the fibers, it is necessary to introduce a suitable bridging or cross-linking agent, i.e. one having a positive or cationic charge, so that it will act as a bridge between the fibers and latex particles. With this interaction performed, a very fine and homogeneous linking of the latex particles on the fiber is achieved, provided, however, that the bridging agent has been introduced at the right moment and in the right quantity. A fundamental feature according to the invention consists in the knowledge, regulation and adjustment of the pH of the bath containing the mixture. The best way to achieve this is to operate at the pH of the latex under consideration, such latices being commercially available at a given chemically stabilized, precise pH value.

According to the present invention, there is carried out a process for the continuous manufacture of latex containing paper from an aqueous medium of fibrous materials, a latex, and a bridging or cross-linking agent which serves to link or bridge the individual paper-making fibers with substantially uncoagulated latex particles. The aqueous medium or furnish may also optionally contain other materials such as fillers and phenolic resins or amino resins. It is important, according to the invention, that the charge (Zeta potential) of the bridging agent used be of a sign opposite to that of the latex and fibrous material, the latter two of which bear the same charge; for best results, the values of the charges of the bridging agent and latex should also be balanced, i.e. after addition of first the bridging agent and then the latex, the Zeta potential of the furnish should be equal to the starting Zeta potential prior to addition of the bridging agent and latex.

It is also important according to the invention to at least minimize and preferably prevent coagulation and precipitation of the latex so that, first, there is no deposit of latex on the equipment and, second, in the product the latex particles exist in the finely particulate state on the fibers, linked thereto by the bridging agent, so that the paper product is highly uniform, homogeneous and porous. With this latter requirement in mind, the use of many conventional paper-making additives, such as alum, which tend to cause precipitation or coagulation of the latex, must be avoided.

The concept of substantially prohibiting or at least minimizing coagulation is very important to the instant invention. Not only does it result in a much superior product as noted above, but is permits repulping of paper produced according to the invention, or scraps thereof, without difficulty, and thereby permits the re-utilization or recycling of scrap thereby decreasing the cost of raw materials and reducing pollution. In the conventional paper machine process approximately 90% or more of the latex becomes coagulated. According to the present invention, the quantity of coagulated latex must not exceed 50%, and preferably does not exceed 20%. Most preferably, latex coagulation is avoided entirely, or is permitted to a degree of at most about 5%. As a direct result of avoiding latex coagulation, porosity of the product is increased and less latex is used. When it is here stated that no substantial coagulation occurs, what is meant is normal coagulation; on the other hand, it may be that some individual latex particles do combine to form somewhat "larger particles", but these "larger particles" are still very small and are in no way comparable to conventionally coagulated particles where the latex clumps into beads.

The instant invention provides a number of important advantages, some of which have been noted above. These advantages include:

(1) Use of conventional paper-making equipment, with no need for large capital investments in new equipment.

(2) The quantity of latex may reach up to 75%, desirably up to 55%, of solids based on the dry fibrous product.

(3) There is a total retention of the latex, and the absence of loose particles in the drainage water, thereby reducing pollution, saving raw materials, and avoiding contamination of the equipment.

(4) The speed of the customary paper-making process is not inhibited, using paper making fibers in the range of 700–25 Canadian Standard Freeness.

(5) Absence of latex adhesion at any point in the trituration circuit, head circuit or clear water circuit.

(6) No need for cleaning the equipment after manufacture, whatever the proportion of latex used.

(7) No clogging of the paper making wire or felt.

(8) No catching or adhesion of the sheet in the press section or drying section.

(9) Reuse of scraps of raw material whatever the ratio of latex used.

(10) The method is applicable to all types of latices.

(11) The method also enables the use, alone or in admixture, of phenolic and amino resins together with the latex.

(12) The products have remarkable mechanical characteristics.

(13) The consumption of latex is reduced significantly particularly with respect to the post-impregnation techniques.

(14) There is a considerable reduction in production cost, taking into account not only what is mentioned above, but also because of the fact that the finished product is complete at the end of the paper machine.

(15) The method is applicable to all fibrous materials usable in paper-making, including vegetable, animal, mineral or synthetic type or to any recycled fiber, so long as the furnish is charged, most desirably with an anionic charge.

The following factors are important in providing a successful process and product according to the invention.

(a) The latex remains substantially uncoagulated, as pointed out above.

(b) The substantially uncoagulated fine latex particles are linked with the paper-making fibers in a homogeneous fashion, providing a porous paper product having remarkable physical properties. The homogeneity of the product, revealed by the election microscope, whereby it is clear that the polymer particles from the latex coat the individual fibers in a uniform and homogeneous way without being coagulated into substantially larger particles, distinguishes the paper from all prior art papers.

(c) The bridging agent is selected from polyelectrolytes which cause binding or linking of the fine latex particles to the fibers without effecting substantial coagulation or precipitation of the latex.

(d) The quantity of polyelectrolyte bridging agent is selected so that substantially all of the latex particles are attracted to the polyelectrolyte which is linked with the fibers. For best results, the Zeta potential of the furnish after addition of the bridging agent and the latex is the same or substantially the same as the starting pulp.

(e) The resultant paper is highly porous approaching the porosity of paper made without latex, at percentages of latex up to 55%.

(f) to achieve the desired objective, selection of concentrations (quantities), sequences and other parameters such as pH are important, as is clear from what has been stated above. Thus, for best results, a latex in any particular circumstance is chosen which is stable at the given pH of the paper-making system, or the pH of the pulp is adjusted to the stabilized pH of the latex used.

The importance of the pH is demonstrated by the fact that if the pH of the furnish is different from the pH of the latex, and the two are intermixed, there will inevitably result at least some coagulation of the latex around the fiber, with the inevitable reduction of process control and desirable properties of the product.

In general, the following categories of papers can be made according to the invention: high strength or tearproof papers such as for maps, plans, regulations, posters, catalog covers, childrens books, bags, technical books; papers for the manufacture artificial leather or leather substitutes, such as book covers, suitcases, automotive and aircraft seats, plasticized coverings, belts, footwear, luggage; non-woven synthetic papers, such as for adhesive bandages, draperies, interior coverings, raincoats; papers for adhesives, such as a medical adhesives, masking tapes, industrial adhesives, disposable sanitary adhesives, adhesive labels; impermeable papers such as for impermeable envelopes; papers for abrasives, such as sandpaper; papers for wall coverings, such as wallpaper; papers for floor coverings; filter papers, such as for water filtering, coffee filtering, oil filtering, automotive filtering for oil, air, fuel and gasoline, gas filters, suction filter paper, vacuum cleaner bags; and papers for decorative laminates. These papers have excellent mechanical characteristics, particularly with respect to rupture length, resistance to breakage by pulling, thermoformability, good resistance to aqueous medium and good resistace to damage caused by repeated foldings.

For a better understanding of the invention, as well as the nature and advantages thereof, reference is now made to a series of specific embodiments, some of which are described below in conjunction with the following drawing wherein:

BRIEF DESCRIPTION OF DRAWING

FIG. 2 is a flow diagram showing recovery of scrap or used paper made according to the invention; and FIG. 3 is a schematic flow chart showing the mechanism of the cross-linking of an anionic fiber with anionic, uncoagulated latex particles by means of an intermediate cationic bridging agent.

DETAIL DESCRIPTION OF EMBODIMENTS

Figure 1:
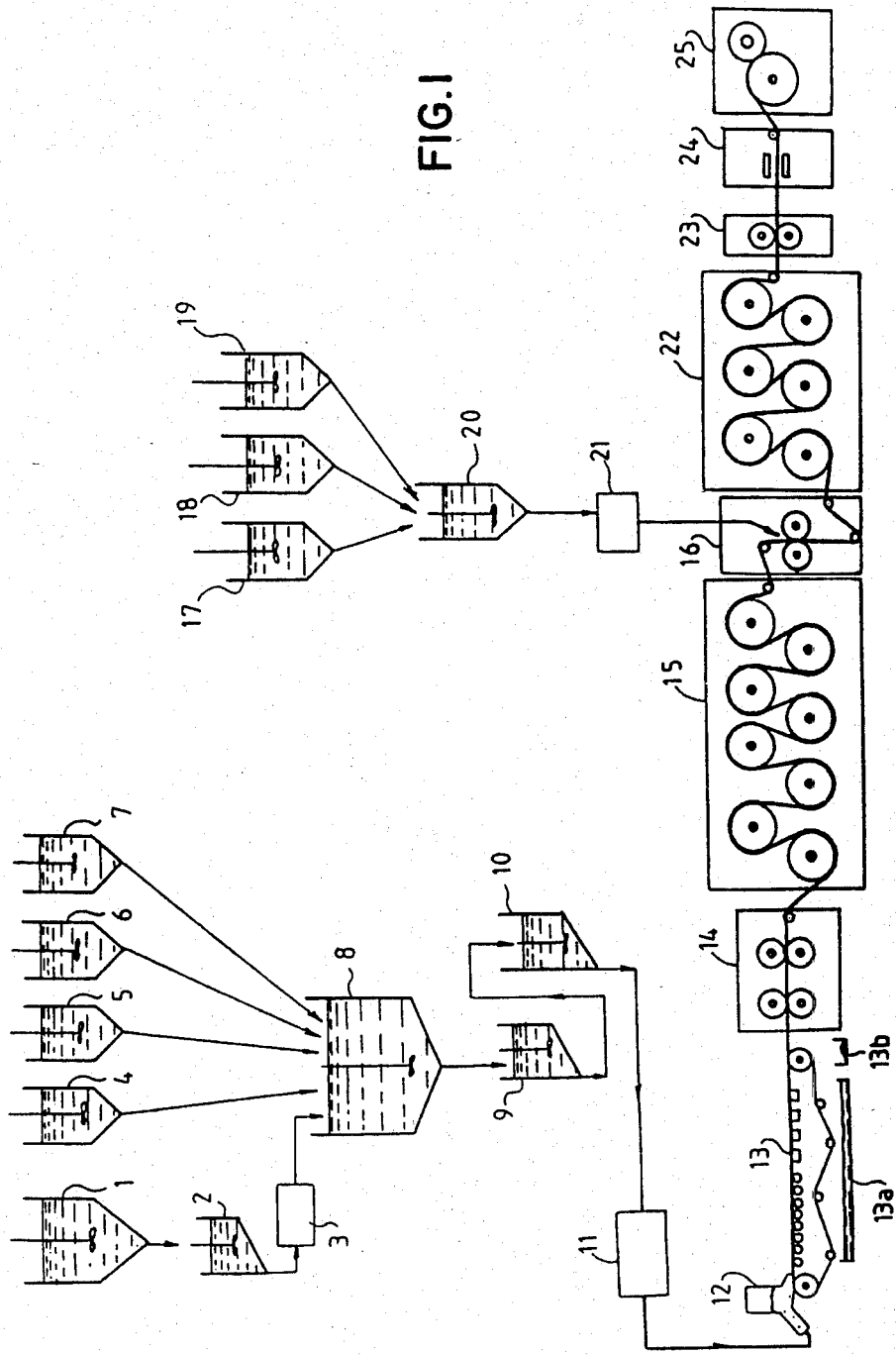
FIG. 1 is a schematic flow sheet showing preparation of paper in accordance with the invention.

In accordance with a first general technique for making superior latex containing paper according to the present invention as disclosed in parent application Ser. No. 349,366, one first adjusts the pH of the aqueous slurry of cellulosic fibers having an ionic charge to a pH value between 4 and 5.5, and preferably between 4 and 4.5.

Next, one adds a cationic bridging agent which will not cause coagulation of the later added, selected latex, whereby the bridging agent becomes attacted to and linked with the surfaces of the fibers. Noting FIG. 3, a negatively charged fiber 30 is thus linked with a positively charged bridging agent 32. The quantity of bridging agent may be calculated so that exactly the right amount will be present to link the latex later added to the fibers already present; in practice, however, it is sometimes more simple to use a somewhat lesser quantity of bridging agent at this stage than will ultimately be needed, and to add the remainder necessary at a later stage to be described below, as this technique permits greater flexibility and less accuracy in calculating the amount of bridging agent needed.

Next, a foam inhibitor, of any known type (e.g. "Nopco DF 160 L" of Nopco Chemical Co.) which will not interfere with the charges of the particles, is added, if desired. Next, the pH is readjusted to a value between 4 and 5.5, if necessary.

Then the latex is added to the pulp slurry and, as schematically shown in FIG. 3, the individual fine latex particles 34, in an uncoagulated state, become attracted to and linked with the bridging agent 32.

At this stage, an additional quantity of bridging agent 32 may be added to ensure that any unbound latex in the slurry will become bound to the fibers 30, to thereby also ensure that no latex will coagulate or precipitate on the equipment. Next, other additives, if any, such as phenolic resins or amine resins are added to the furnish, and the pH is again readjusted to a value between 4 and 5.5, if necessary.

As noted above, the fibrous material may be any fibrous material, so long as it has the necessary ionic charge. Desirably, and most usually, the fibrous material will be paper pulp i.e. wood pulp, but it may consist of or contain other fibers such as glass fibers, synthetic fibers, textile fibers, etc. In using the preferred cellulosic fibers, it should be understood that the starting pulp may be mechanical pulp, semi-chemical pulp, chemical pulp, unbleached chemical pulp, bleached chemical pulp, soda pulp, sulfate pulp, kraft pulp, bisulfite pulp, rag pulp, steeped straw pulp, bleached straw pulp, etc., these listed pulps being all formed largely of cellulose fibers.

The selection of a suitable bridging agent of charge opposite to that of the pulp and the latex is very important according to the invention. Failure to use a satisfactory bridging agent will result in coagulation and precipitation of the latex which, as noted above, is to be avoided or at least greatly inhibited. The bridging agent disclosed in parent application Ser. No. 349,366 has been found to be very satisfactory, causing at most about 20% coagulation of the latex, which is tolerable in most situations; this particular bridging agent is a high molecular weight, water-soluble polyamine polyelectrolyte having a molecular weight greater than 15,000 and a very cationic potential, sold as a coagulant for water clarification under the trademark "Primafloc C-3" by Rohm and Haas. It has a solids content of between 0.2 and 10%.

Other cationic bridging agent may be selected from polyelectrolytes sold as coagulants or possibly retention aids, but in each case the polyelectrolyte must be tested in conjunction with the particular latex contemplated and the pH selected to be sure that the polyelectrolyte will not cause substantial coagulation of the latex; in this regard, most conventional coagulants and retention aids such as cationic starch and certain other polyamines (e.g. "Retaminol C", Bayer) are unsatisfactory because as they cause too much latex coagulation. "Lufax 295" (a high molecular cationic salt of a polyamine sold at a pH of 1.8 at 1% aqueous solution—Rohm & Haas) has also been found to be a satisfactory bridging agent at acid pH.

Regarding the selection of the latex, any latex can be used in the form of a finally divided suspension which has been stabilized at the acid pH of between 4 and 5, preferably between 4.2 and 4.5, utilized in accordance with the first general embodiment of the invention as disclosed in parent application Ser. No. 349,366. Desirably, the amount of latex used is in an amount between 3 and 75% (dry product), preferably 10–55%, with respect to the total dry weight of the fibrous material. The latex can be natural rubber latex stabilized at such a pH, or it can be an artificial latex, such as chlorobutadiene latex (e.g. "Butachlor L" of Rhone-Poulenc) or acrylic latex. While any anionic latex which has been stabilized at the working pH, and which preferably has a solid content between 5 and 50%, preferably between 7 and 15%, and a Brookfield viscosity between 30 and 650 centipoises at 25° C., can be used, a particularly satisfactory latex has been found to be an ethylacrylate and acrylonitrile complex sold under the trademark "Rhoplex P-339" by Rohm & Haas. "Rhoplex P-339" is sold at a solids content of 44%, a pH of 4.8 and a viscosity of 75 Cps, and is recommended for beater deposition by Rohm & Haas. Other suitable latices include "Rhoplex LC-40" sold at a pH of 4.5, "Rhoplex HA-24" sold at a pH of 3.0, and "Rhoplex E-269, sold at a pH of 3.2.

In general, the diameter of the particles of latex polymer suspended in the latex aqueous medium is between 0.01 and 0.5 microns and preferably between 0.1 and 0.2 microns. While these particles are, of course, conventional for latex in the uncoagulated state, a novel aspect of the invention is that such particles become associated with the fibers while remaining in their finally particulate form, i.e. they do not coagulate into substantially larger particles but remain in finally particulate form of approximately the same size in the paper product. This is confirmed not only by photomicrograph but also by the fact that when the paper product is repulped to effect recycling thereof, the latex particles are redispersed; this would not be possible if the latex were coagulated.

The proportions of ingredients are also important in achieving the results of the present invention. The polyamine bridging agent mentioned above having a solids content between 0.2 and 10% is introduced into the fibrous pulp slurry in an amount between 0.1 and 3.5% based on the dry weight of said polyamine with respect to the total dry weight of the latex to be added. As noted above, it may be helpful to subsequently add a second charge of the bridging agent and a quantity of 0.1-2% of the dry polyamine with respect to the total dry weight of the latex already added is thus subsequently added.

Another important aspect of the invention is the use of water which is substantially free of aluminum, chloride, sulfate and sulfamate ions in greater than trace amounts. If these ions are present in the aqueous medium of the furnish, interference occurs and the bridging agent is not able to carry out its function. In practice, it has been found that hard water lacking the aforementioned ions functions best to effect the present invention.

More particularly, the water used in the process must not contain more than about 22 mg/l of chlorine, more than about 46 mg/l of sulfate, more than about 0.2 mg/l of sulfamate and more than about 0.2 mg/l of aluminum.

The remaining additives and parameters are less critical. For example, any foam inhibiting agent may be used which does not interfere with the linking function as described above and schematically illustrated in FIG. 3. As noted above "Nopco DF 160 L" has been found fully suitable. A foam inhibiting solution having a solids content between 2 and 20% is suitably used in an amount of the solution between 0.05% and 0.25% based on the total dry weight of fibrous material. There may also be added phenolic resin e.g. a phenolic resin ("HRJ 1467" of Schenectady Co.) having a solid material content of 50-85% and a Brookfield viscosity between 5,500 and 7,000 centipoises in an amount based on the dry product of between 0.01 and 50% based on the total dry weight of the fibrous material (or Resin 55-58 of Rousselet S.A.), or an amino resin (e.g. Resin 31-03 of Rousselot S.A. a urea-formaldehyde resin). There may also be added dyes, pigments, fungicides, insecticides, fire proofing agents, internal sizing agents, inert mineral fillers, each separately or in combination, bearing in mind that the additives must not adversely affect the binding mechanisms as schematically illustrated in FIG. 3.

As noted above, according to the first general embodiment as disclosed in parent application Ser. No. 349,366, it may be necessary to adjust the pH at various stages. Such a pH adjustment may be effected by means of hydrochloric acid, sulfuric acid, or mixtures thereof.

As noted above, the unique binding of the fine latex particles to the fibrous material by means of forming an intimate bridge between the two elements (fiber and latex) through the intermediate bridging agent, and without the latex undergoing substantial coagulation, is what characterizes the invention. The bridging which occurs provides a remarkably homogeneous latex crosslinking with the individual fibers which is very reliably reproducable. It is this mechanism which confers on the fibrous sheets of the present invention their properties which differ so radically from those sheets containing latex prepared according to processes of the prior art.

After formation of the paper in a paper-making machine, the paper may be surface treated on one or both faces thereof in accordance with conventional practice, such as by coating with one or more of conventional starches, carboxymethyl cellulose, acrylic suspensions, polyvinyl alcohol, firing proofing agents, fungicides, insecticides, dyes, organic solvent barriers, sizing agents, magnetic coating agents, mineral and organic charges. Such materials may be added to the damp web or the dried web, as is conventional.

In a second general process as is disclosed in parent application Ser. No. 397,195, essentially the same mechanism is effected while working at a neutral pH ranging from about 6.8 to about 7.3. Operation at this pH is made possible by the proper selection of a bridging agent which will work at this pH without causing coagulation of the latex being used. One such bridging agent is a condensate of low molecular weight diamide and formaldehyde; another is "Nadavine LT" (Bayer), a low acid aqueous solution of polyamide/polyamine epichlorohydrin resin, free of formaldehyde. The preferred bridging agent is a condensate of diamide and formaldehyde having the formula:

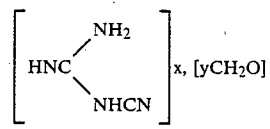

the ratio x/y being comprised between 0.1 and 3, and preferably between 0.7 and 1.7, the molecular weight being comprised between 400 and 1500 and preferably between 1000 and 1100.

According to this general process, it is also desirable to utilize an internal sizing agent, such as Aquapel (Hercules), which works at a neutral pH. This internal sizing agent is used in conjunction with a cationic starch which serves to fix the internal sizing agent. In addition, in this second general process as disclosed in parent application Ser. No. 397,195, it may also be desirable to use large amounts of mineral or organic filler, particularly in the preparation of construction paper, coating paper for the manufacture of floor and wall coverings, insulation paper for heat-proofing and sound-proofing, packing papers, and panels. It may also be desirable to use, in the manufacturing of such products, relatively large quantities of waste products as explained in more detail below.

In general, these products are made by carrying out the following process:

(a) Placing paper-making sludges, which may comprise mixtures of mineral filler and cellulose fiber, e.g. 70% mineral filler and 30% cellulose fibers, in suspension in water at a pH close to neutral and in a concentration between 15 and 50 grams per liter;

(b) adding a urea-formaldehyde resin (0.01–2%) as an antiseptic or bacteriacide to prevent bacterial attack;

(c) adding a bridging agent which functions well at a neutral pH, e.g. one formed of a low molecular weight diamide and formaldehyde condensate or "Nadavine LT.";

(d) adding the latex in the amount of 3–75%, and preferably 30–40%, with respect to the dry weight of the paper-making sludge;

(e) adding, if insufficient bridging agent was added in the initial charge, a second and smaller quantity of the same bridging agent; and (f) then adding a mineral and/or organic filler in an amount between 5 and 70% based on the total solids, such a filler comprising an inorganic mineral filler or an organic paper-making fiber or mixtures thereof, and including more specifically fillers selected from the group of calcium carbonate, magnesium carbonate, kaolin, talc, titanium oxide, gypsum, ochres, silico-aluminates, asbestos, amine resins, phenolic resins, leather waste, sawdust, starches, paper-making pulps, etc.

In accordance with the process, the dry weight of the added bridging agent is from 0.01 to 10%, and preferably between 2 and 6%, with respect to the dry weight of the latex used, for the first addition, and if more is subsequently needed from 0.01 to 5%, preferably between 1.5 and 3.5%, with respect to the weight of the latex used, for the second addition.

According to a third general process, the pH used is the pH of the stabilized latex selected. This opens up the process to wide possibilities in that essentially any anionic latex can be used, but it also then requires a very careful selection of the cationic bridging agent which, consistent with the invention, must not cause substantial coagulation of the latex. Working at the pH at which the latex is sold in stabilized condition serves to minimize the chances of coagulation. For example, if the latex selected has a stabilized pH of 9, then this will be the pH to which the entire system will be adjusted. The Zeta potential of the latex and of the initial pulp is measured, and the bridging agent is then selected, and used in such a quantity that the Zeta potential of the final furnish, after addition of the bridging agent and latex, is essentially the same as that of the initial pulp.

For best results, one carries out the following steps as routine, initial analyses:

(1) The water to be used in the paper-making process is chemically analyzed to determine the anions and cations and hardness particularly with regard to alkaline-earth salts. As indicated above, the water must be substantially free of chloride, aluminum, sulfate and sulfamate ions.

(2) The desired fibrous raw material for obtaining the final product is selected.

(3) The Zeta potential of this fibrous material in suspension in water at the paper-making concentration is measured.

(4) The cationic bridging agent is selected and its Zeta potential is determined. The bridging agent should have a Zeta potential the absolute value of which is between 60–120% of the fibrous material and the latex.

(5) The quantity of cationic bridging agent necessary is then calculated as a function of the previously measured Zeta potential. Most preferred, as indicated above, is utilization of a quantity of the bridging agent so that, after addition of the latex, the Zeta potential of the final furnish is then essentially the same as that of the aqueous starting pulp slurry.

(6) The elastomer, Polymer or co-polymer latex desired to be linked to the fibrous material is then selected as a function of the Zeta potential of the fibrous material and the Zeta potential of the latex at its concentration of use. It should be noted that the process can be reversed, i.e. it is possible for example to select the latex first and then choose the fibrous material and bridging agent as a function of the Zeta potential of the latex. Regardless, consistent with the general features of the invention, the charge of the latex is anionic, i.e. the same as the fibrous material.

(7) The pH of the fibrous aqueous pulp is determined. The pH of the latex is determined and its concentration is then adjusted by adding water, suitably to about 10% solids, without altering the pH of the latex substantially, i.e. its pH is maintained at plus or minus 0.2 of its initial, stabilized pH.

(8) The pH of the fibrous pulp and the pH of the cationic bridging agent are then individually adjusted to a value within about plus or minus 0.1 of the pH of the latex.

(9) A laboratory test is then conducted of the linking time, i.e. of the time required for complete linking of the polymer to the fibrous material by use of the cationic bridging agent.

It should be noted that the third general process of the invention makes it possible to link a wide variety of latices* to the fibrous material, regardless of the pH, i.e. the paper-product can be made by linking of a latex having a pH anywhere between 1 and 14. Thus, this process applies to the use of any acid, neutral or alkaline anionic latex stabilized in an aqueous medium.

*In addition to those mentioned above, Rohm & Haas E941, a styrene/acrylic latex, and Dow 685, a carboxylated styrene/butadiene latex stabilized at pH 5.0–6.5 and having a particle size of 140–160 nm, have been used according to the invention Accordingly, after the preliminary tests set forth above have been carried out, the product can be produced according to the following operation:

(i) Putting the selected fibrous material in suspension in water.

(ii) Refining, blending, etc. the fibrous mixture thus constituted, according to whatever criteria are selected for making the desired final product, all in accordance with conventional practice.

(iii) Adjusting the pH of the fibrous pulp to be as close as reasonably possible to that of the latex when will later be added thereto.

(iv) Adding a diluted and pH adjusted solution of the cationic bridging agent, in a proportion based on the dry weight of the latex which is later to be added to the mixture, to the pulp (v) Upon addition of the dilute solution of bridging agent to the fibrous material, stirring should be maintained for a period of time sufficient for all the bridging agent to become attached to the fibers. This will normally take from 2 to 4 minutes and can be more precisely determined in the laboratory, as indicated above, the time depending on the initial Zeta potential of the fibrous material and the Zeta potential of the bridging agent added.

(vi) Adjusting the pH of bridging-agent-linked pulp, if necessary, to within plus or minus 0.2 of the pH of the latex to be introduced.

(vii) Introducing the latex into the mixture with gentle stirring, avoiding any broke in the open air and also avoiding violent stirring.

(viii) Waiting 2 to 3 minutes to be sure that the total linking has been completed. This is easily checked by draining a small part of the mixure in which case the water will be extremely clear, free of polymer particles if all the latex polymer particles have become adhered to the fibers.

(ix) If necessary adding further bridging agent, if the initial quantity of bridging agent added was less than that necessary to effect complete removal of latex particles from the aqueous phase onto the fibers.

(x) and adjusting the Zeta potential of the final mixture to the same value as that of the starting fibrous material.

(xi) At this stage, the mixed furnish is ready to be formed into a sheet of paper, such as on a conventional paper-making machine, or into a flat or molded panel, etc. The furnish contains various stabilized constituents linked as schematically shown in FIG. 3, at the right side. Therefore, it is absolutely necessary to see that the pH conditions in particular do not undergo any change, i.e. the product must be formed and dried without a change in pH and any dilution that needs to be made with regard to the furnish must be made with an aqueous medium such as sulfuric acid preadjusted to the pH of the mixture thus produced. Incidentally, this last point is in strong contrast to conventional procedures for making latex containing paper, where the pH is not so carefully controlled and where various charged materials, such as alum and retention aids, are often added immediately before product formation.

The determination of the Zeta potential of all the free agents present makes it possible to control the van der Waals forces which are asserted among the various particles, and to know with precision the force and rapidity of attraction of the various particles present in the aqueous solution. In other words, the determination of the Zeta potential of all the materials present (fibers, latex and bridging agent) make it possible for them to attach as shown in FIG. 3 in order to obtain a very fine and homogeneous controlled coating of plastomer or elastomer particles on the fiber. The adjustment and regulation of the pH of the reactive medium is therefore of primary importance. If there is a variation of the pH or if the pH of the reactive medium is different from that of the latex, there will inevitably result coagulation of the latex which is not desirable.

The wet sheet or panel leaving the forming machine is perfectly recyclable without any difficulty, because the latex has not been coagulated. Any scrap or broke obtained during industrial manufacturing can simply and easily be recovered as raw material for the preparation of new product. It has already been pointed out above that the Van der Waals forces can be cut by the use of chloride, sulfate, sulfamate ions, or aluminum ions.

It also follows that papers made according to the present invention can be re-used, recuperated or recycled, contrary to latex containing paper prepared in accordance with the prior art. This repulpability and recycling is easily carried out in an aqueous medium, in the cold state, in the presence of a wetting agent and a small quantity, e.g. 0.01 to 0.15% with respect to the volume of water and 0.2 to 1.5% with respect to the weight of dry fibrous material, of chloride ions and/or aluminum ions and/or sulfate ions and/or sulfamate ions. It is, of course, the extremely fine particle size of the latex polymer particles deposited on the fibers which explains the easy repulpability of the papers prepared in accordance with the present invention.

Of course, before reuse, the aqueous medium must be treated so as to remove the chloride, sulfate or sulfamate, or the slurry containing these ions must be diluted, e.g. to no more than about 22 mg of chloride ion per liter of water. Linking by means of a bridging agent will not take place in the aqueous medium contains more than about 22 mg/l of chloride, about 46 mg/l of sulfate, about 0.2 mg/l of sulfamate, and about 0.2 mg/l of aluminum. Of course, even with higher contents of these ions, the pulp can be re-used in conventional paper-making, it being understood that the inactive latex particles merely act as an inert filler.

Normally, such ions are necessary for the recycling operation only when the latex content of the product exceeds 40-45% by weight of dry polymer based on the total weight of the dry product. Otherwise, it is merely necessary to subject the scrap or broke to conventional beating to separate the individual, homogeneous latex-linked with fibers from one another.

With regard to proportions of material, it has been pointed out above that for optimum results, the relative quantities of the latex and bridging agent selected are based not on their weights, but instead on their relative Zeta potentials so as to achieve a furnish immediately prior to product formation which has a Zeta potential substantially equal to the Zeta potential of the starting pulp. On the other hand, this result can be achieved using varying amounts of latex relative to the amount of starting fibrous material, it being understood that the less latex used relative to the fibrous material, the more the product will approach the properties of conventional paper. So, in essence, the quantity of latex relative to the quantity of fibrous material will depend on the purpose to which the product is to be put, and this will be discussed in more detail below. In general, however, the amount of latex used, consistent with the first two general processes described above, will vary between 3 and 75% (dry product), preferably 10-55%, with respect to total dry weight of the fibrous material; and the quantity of cationic bridging agent will be balanced relative to the amount of latex used as pointed out above. Bearing in mind that the nature of the latex itself, e.g. whether it is a harder or softer polymer, will affect the properties of the product, so also will the quantity of latex used.

After the product has been formed and water drained therefrom, it may be desired, indeed necessary for certain particular applications, to perform one or more surface treatments, after the first drying zone. These various treatments can be performed according to known techniques, or as described in the aforementioned co-pending parent patent applications, and below. Depending on the nature of the surface treatment, it may be necessary to heat-set the material added during the surface treatment, such as in a further drying operation. At this point if the product is a thin web, it is then rolled and is ready either for commercial distribution or form further treatment, depending on the desired end use.

Among the surface treatments which may be utilized are a variety of surface sizing operations, including the application of solubilized or insolubilized starches, solubilized or insolubilized carboxymethyl celluloses, acrylic suspensions, solubilized or insolubilized polyvinyl alcohols, barrier layers to organic solvents, natural or synthetic sizing agents, bonding agents, etc. It should, of course, be understood that these various treatments, and the after-treatments as well, may be applied to the product regardless of whether it is formed by the first, second or third general processes of the instant invention.

As an example of special treatment, there may be mentioned treatments conferring an adhesive layer on such paper. Thus, adhesive papers for medical, industrial and technical usage are at present manufactured according to the prior art from paper having a basis weight of 50–160 g/m². Such paper substrate is impregnated with a polymer or co-polymer or mixture of polymers, e.g. styrene polymers, in one or more passes. When this operation is finished, the impregnated paper then undergoes two operations carried out in a solvent medium, i.e. (1) deposition on a face of the paper substrate of an anti-adhesive layer allowing the subsequent winding of the paper onto a reel and a winding of the finished product for use, followed by (2) deposition on the other face of the paper substrate, in another machine, of an adhesive layer.

Contrary to the prior art, it is possible according to the present invention to apply the anti-adhesive layer following the first drying and while the paper web is still in the paper-making machine. This is an important improvement because the introduction of solvents in paper manufacturing shops has posed serious financial and environmental problems. Thus, in accordance with the present invention, the layer of the anti-adhesive material can be formed by an aqueous suspension of carboxymethyl cellulose in an amount between 0.01 and 10% which suspension has been heated to 90°–95° C. for 5–25 minutes. More particularly, the carboxymethyl cellulose suspension desirably contains in addition from 0.01% to 85% of a polyester and/or from 0.01% to 75% of an anionic or non-ionic silicone emulsion stabilized in a aqueous medium at a pH between 5 and 6.

The invention will be better understood from the following specific examples which describe various ways of implementing the process of the present invention, such as by means of the installation shown schematically in FIG. 1 by way of non-limiting example in the accompanying drawing. It should, however, be understood that the following examples are given solely by way of illustration, and are in no way intended to constitute limitations on the invention.

I-EXAMPLES ACCORDING TO THE FIRST GENERAL PROCESS

EXAMPLE I-1

Fibrous paper pulp material coming from a pulp factory is introduced into tank 1 in the presence of water and dye material, if desired, and it undergoes therein appropriate agitation for putting the fibrous particles into suspension. The solids content of the mixture is adjusted to about 2–5% as is usual. The fibrous suspension prepared is fed into storage tank 2, then into section 3 for so-called refining and hydration of the fiber, so that the fibrous material undergoes the structural modifications required for subsequent formation into sheets. In the particular case of paper, the structural modification confers on the mixture a draining index according to the Schopper-Riegel method between 10° and 50° SR. The fibrous material prepared in this way is then fed into the mixing tank 8.

Meanwhile, the following reagents and raw materials are prepared: (a) an acrylic latex of an anionic character ("Rhoplex LC-40") with a Brookfield viscosity between 30 and 650 centipoises having a high film-forming power from 0° C., is introduced into tank 4 provided with adequate agitation, to undergo therein an aqueous dilution for forming a solution whose solids content is between 5 and 50%. Its pH is adjusted to 4.2–4.5.

(b) In tank 5, having an appropriate agitation and heating means (coil or double casing for example), an aqueous solution is prepared of polyelectrolyte bridging agent ("Primafloc C-3") having a polarity opposite that of the latex. The solids content of the preparation must be between 0.2 and 10%.

(c) Tank 6 having appropriate agitation serves for preparing an aqueous solution of a foam-inhibiting agent ("Nopco DF 160 L"). The dilution is adjusted so that the solids content is between 2 and 20%.

(d) Tank 7 having appropriate agitation is used for storing a resin solution (phenoplast or aminoplast) containing between 55 and 85% of solid materials and having a Brookfield viscosity between 5500 and 7500 centipoises (at 25° C.).

The procedure is then as follows:

The fibrous material previously prepared and introduced into tank 8 is brought, under agitation, to a pH between 4 and 5.5, preferably between 4 and 4.5 by addition of an acid which may be hydrochloric acid, or sulfuric acid. The polyelectrolyte solution prepared in tank 5 is introduced into the fibrous mixture in tank 8 under agitation, in a proportion between 0.1 and 3.5% of dry product with respect to the total dry weight of latex used in the following step, and more particularly between 0.5 and 2.5%. The foam inhibiting solution prepared in tank 6 is added to the mixture in tank 8, under agitation, in a ratio of dry product of 0.05 to 0.25% of the total dry weight of fibrous materials. The pH is then readjusted, if necessary, to the above indicated values.

The latex prepared in tank 4 is then injected into the mixture in tank 8 under appropriate agitation, in a proportion preferably between 3 and 60% of dry product with respect to the total dry weight of fibrous materials. To the mixture thus obtained in tank 8 it is advisable to add, under appropriate agitation, a complementary amount of the bridging agent prepared in tank 5, between 0.01 and 2% of dry product with respect to the dry weight of latex, so as to ensure the cross-linking and complete fixing of the latex on the fibrous material used.

The phenolic resin (HRJ 1467) solution stored in tank 7 is then introduced under slow agitation into the mixture in tank 8, in a proportion of dry product between 1 and 50% with respect to the total dry weight of fibrous materials. The pH of the final mixture thus obtained in tank 8 is then readjusted, if necessary, to the above-mentioned values. The whole of the preparation is then conveyed to storage tank 9, then to tank 10 feeding the manufacturing circuit of a machine for manufacturing a continuous paper band.

The suspension contained in tank 10 undergoes continuously in section 11 an aqueous dilution bringing the total solids content of the mixture, at distribution point 12, to a value between 0.2 and 1.5%. Distribution point 12 continuously feeds the sheet-forming section 13, usually called the "wet end", in which the sheet is formed by suction of the water from the mixture through a rotating metal (or plastic) wire cloth or screen. The water is drained, then drawn by vacuum, is recovered at point 13a to be recycled at 1 and 11. The sheet calibrated in width at the end of part 13 is conveyed to a pressure drying section 14, whereas the excess width or clipping scrap is recovered at point 13b to be recycled to storage tank 9.

The sheet continuously formed in this way is then directed into the drying section 15 in which each face of the sheet is dried alternately by means of a battery of drying drums. The solids content of the sheet on entering the drying section 15 is generally between 25 and 50%. After drying in section 15, the sheet may be fed, if so desired, into a coating section 16 where different products may be applied to one or both faces.

In the particular case of paper manufacture, the usual name for this coating equipment may be, by way of non-limiting example, the size-press, the different process for coating on one or both faces such as Champion, air blade, trailing blade systems, etc. Passing the sheet during continuous manufacture through this coating section is optional. The coating equipment 16 may be used for providing the paper with complementary properties is described above, particular and specific to the products used in this section and for creating end-use products from the continuous sheet containing in its mass fibrous materials, latex and optionally phenolic resin. By way of non-limiting examples, the products below may be used in section 16 after appropriate preparation in tank 17, 18, 19, proportioned, mixed or not in tank 20, filtered and diluted adequately in section 21:

soluble or insolubilized starches of all kinds,
soluble or insolubilized carboxymethylceluloses,
acrylic suspensions,
polyvinyl alcohols,
solutions for fireproofing, fungicide, insecticide treatment,
dye materials,
barrier solutions to organic solvents in general,
synthetic sizing agents,
magnetic coating,
mineral charges,
synthesis products, etc.

If it passes through section 16, the sheet is then dried again, simultaneously on each face, in section 22. If this optional treatment in section 16 is not used, the sheet passes directly from section 15 to section 16 is not used, the sheet passes directly from section 15 to section 22. On leaving section 22, the sheet may be engaged in section 23, with a view to conferring thereon complementary or particular properties by a thickness calibrating, embossing or surfacing treatment such as calandering. The sheet may also be engaged in section 24 where it undergoes high temperature radiation for ensuring, if necessary, complete curing of the materials forming it.

As with the treatment in section 16, the treatments in section 23 and/or 24 are optional, but these complementary operations may provide properties for special uses. If sections 23 and/or 24 are not used, the sheet is fed directly into section 25 where it is wound on a reel.

EXAMPLE I-2: PREPARATION OF A SUPPORT PAPER FOR ABRASIVES

Following Example I-1, Paper is made containing (expressed in percentage of dry product):
76.3% of bleached resinous wood fibers,
0.35% of electrolyte of a cationic character ("Primafloc C-3")
0.10% of foam inhibitor ("Nopco DF 160 L"),
20% of latex of an anionic character ("Rhoplex P-339"),
3.25 % of phenolic resin ("HRJ 1467").

This paper sheet is prepared continuously, as described in Example I-1, however without passing through section 16, but passing through section 23 for calibration, then directly to section 25.

EXAMPLE I-3: PREPARATION OF A PRINTABLE SUPPORT PAPER FOR ABRASIVES

This paper contains (expressed in percentage of the dry product):
75% of bleached resinous wood fibers,
0.30% of cationic electrolyte ("Primafloc C-3"),
0.10% of foam inhibitor ("Nopco DF 160 L"),
20% of anionic latex ("Rhoplex P-339"),
3.20% of phenolic resin ("HRJ 1467"),
1% of oxidized maize starch,
0.20% of urea-formaldehyde resin ("Resin 31-03"),
0.20% of an internal sizing agent ("Aquapel 360 XV" of Hercules).

This paper is prepared with passage through sections 16-22-25 of the apparatus of FIG. 1.

EXAMPLE I-4: PREPARATION OF A SUPPORT PAPER FOR ADHESIVES

This paper contains (expressed in percentage of the dry product):
73% of bleached resinous wood fibers,
26.5% of anionic latex ("Rhoplex P-339"),
0.45% of cationic polyelectrolyte ("Primafloc C-3"),
0.05% of foam inhibitor.

This paper is prepared in accordance with the process described in Example I-1, with direct passage from section 15 to section 25 of FIG. 1.

EXAMPLE I-5: PREPARATION OF A PRINTABLE SUPPORT PAPER FOR ADHESIVE

This paper contains (expressed in percentage of the dry product):
70% of bleached resinous wood fibers,
28.3% of anionic latex ("Rhoplex P-339");
0.45% of cationic electrolyte ("Primafloc C-3"),
0.05% of foam inhibitor,
0.20% of urea-formaldehyde resin ("Resin 31-03"),
1% of oxidized maize starch.

This paper is prepared in accordance with the process described in Example I-1, with passage through section 16-22-25.

EXAMPLE I-6: PREPARATION OF A POROUS PAPER FOR MANUFACTURING BAGS FOR VACUUM CLEANERS

This paper contains (expressed in percentage of the dry product):
- 48.5% of unbleached resinous wood fibers,
- 48.5% of bleached resinous wood fibers,
- 2.85% of anionic type latex ("Rhoplex P-339"),
- 0.15% of cationic type electrolyte ("Primafloc C-3").

This paper is prepared according to the process described in Example I-1 with passage through the following section: Section 15-section 22-section 25

EXAMPLE I-7: PREPARATION OF A BASE PAPER FOR MANUFACTURING TEAR-PROOF ENVELOPES

This paper contains (expressed in percentage of the dry product):
- 63% of bleached resinous wood fibers,
- 36% of anionic type latex,
- 1% of cationic type electrolyte.

This paper is prepared as described in Example I-6.

EXAMPLE I-8: PREPARATION OF A PAPER WITH AN ANTI-ADHESIVE LAYER

The procedure as described in examples I-4 and I-1 is repeated, with passage through the following sections of the FIG. 1 apparatus 1 to 15, then 16-22-23-25:

The product, before entering section 16, has the following compsotion (expressed as dry product):
- 73% of bleached resinous wood fibers,
- 26.5% of an ethylacrylate and acrylonitrile complex ("Rhoplex P-339") stabilized at a pH of 4.2 to 4.5,
- 0.45% of high molecular weight polyamine (e.g. the polyelectrolyte sold under the trademark "Primafloc C-3" by Rohm and Haas).
- 0.05% of foam inhibitor.

The anti-adhesive formulation is prepared in tank 17 in the following way: a dose of powdered or granulated carboxymethylcellulose is introduced under agitation into water so as to form a solution in which the content (expressed as dry product) is between 0.05 and 5%. This solution then is brought up to a temperature of 90°–95° C. and this temperature is maintained for about 20 minutes and then it is allowed to cool. An aqueous silicone emulsion ("WB 705" of Water Based Systems, Inc., sold at 52% solids) stabilized beforehand at a pH of 5.2, is then poured into tank 18 containing water until a silicone concentration of about 20% is obtained.

In tank 19, an aqueous solution is prepared containing about 20% (expressed as dry material) of polyester emulsion (WB 937 of Water Based Systems, Inc., 60% solids) stabilized beforehand at a pH of 5.4, which emulsion has a Brookfield viscosity (at 25° C.) of 600 centipoises.

The three solutions from tanks 17, 18, 19 being prepared, are then mixed in tank 20 in the following way:
- 80–120 parts of solution from tank 17;
- 2–15 parts of solution from tank 18;
- 2–25 parts of solution from tank 19.

The quantity of solids of the solution contained in the tank is between 2 and 8%.

This solution thus obtained is deposited on a single face of the paper which, after passing through sections 22-23-25, has the following composition:
- bleached resinous wood fibers: 71%
- acrylic copolymer: 26%
- polyeletrolyte: 0.43%
- foam inhibitor: 0.04%
- anti-adhesive material (deposited on a single face): 2.53%

EXAMPLE I-9: RECUPERATION OF USED PAPER

The installation required for recycling old latex based papers is shown schematically in FIG. 2.

Into tank 101 containing 2000 liters of water are introduced 500 kg of waste and clippings of a paper according to the present invention which has the following composition:
- unbleached resinous wood fibers: 45.5%
- bleached resinous wood fibers: 45.5%
- uncoagulated latex ("Rhoplex P-339"): 8.85%
- polyelectrolyte ("Primafloc C-3"): 0.15%

The agitator is started up and agitation is carried out until about 80% of the paper is reduced to fragments. This reduction to fragments is checked by the usual checking processes in paper-making. At this stage, there still remains some very fine agglomerates called in paper-making jargon "buttons" or "pellets". The mixture thus obtained is then fed into a breaking up apparatus 105 called a "pellet reducer" (e.g. a pellet reducer sold under the trademark "Hydraflaker" by Black Clawson), while recycling the liquor through piping 105 towards tank 101.

For this operation the repulping time in tank 101 was 25 minutes, pellet reduction time 15 minutes, i.e. a total of 40 minutes for making the 500 kg of fibrous material re-usable which are then sent for reuse through piping 104.

EXAMPLE I-10: RECOVERY OF USED PAPER HAVING A VERY HIGH LATEX CONTENT

Composition of the starting paper:
- bleached resinous fibers: 51.2%
- ethylacrylate/acrylonitrile type latex ("Rhoplex P-339"): 45%
- polyelectrolyte ("Primafloc C-3"): 1.8%
- synthetic sizing agent ("Aquapel 360 XV"-Hercules): 0.20%
- phenolic resin: 2%
- carboxymethylcellulose: 0.8%

The procedure is carried out as described in Example I-9, but 0.5% of bleach p/volume is introduced. The repulping time was 40 minutes and the pellet reduction time was 15 minutes, i.e. 55 minutes for the 500 kg of material used. The raw material thus recovered is re-used in manufacturing a conventional printing-writing paper base at the rate of 10% dry product with respect to the total dry weight of the manufactured base.

ANALYTICAL EXPERIMENTATION REPORT

The following tables disclose principal characteristics of the products obtained in accordance with the process of the present invention (examples I-9 and I-10), with respect to commercial products containing latex.

Table I shows the mechanical characteristics and table II the characteristics of a paper in which a recycled pulp based fibrous material has been used:

TABLE I

COMPARISON OF THE MECHANICAL CHARACTERISTICS

| Tests | Material of the present invention | Commercially available material |
|---|---|---|
| Weight/m² | 149.5 | 147 |
| Bursting force (kg/cm²) | 5.0 | 4.5 |
| Breaking load (in kg) | | |
| *SM | 13 600 | 11 800 |
| **ST | 6 500 | 9 900 |
| Breakage length (in meters) | | |
| SM | 6 060 | 5 350 |
| ST | 2 900 | 4 490 |
| Tear strength (in kg) | | |
| SM | 107 | 82 |
| ST | 134 | 87 |
| Amount of latex | 28% | 50% |

*SM: travelling (machine) direction
**ST: crosswise direction

An examination of the figures given in table I shows that the mechanical qualities of the paper in accordance with the invention are superior, and this even for a proportion of latex on the order of only 55% with respect to the proportion of latex in the paper available commercially. The papers obtained in accordance with the process of the present invention have not only excellent physical strength, but their printability as coated paper sheets is quite good, not only insofar as their ability to take ink, is concerned but also insofar as their clarity and their reproduct of colors are concerned.

TABLE II

| | Product of the invention, latex amount 20% | Convention products commercially available | |
|---|---|---|---|
| | basic raw material 100% old recycled papers | raw material 100% noble pulp | raw material 100% old papers |
| Weight per m² (in grammes) | 88.6 | 90 | 83 |
| Thickness in | 108 | 105 | 160 |
| Bursting index | 29.5 | 22 | 12.5 |
| Porosity BENDTSEN ml/min | 250 | 160 | 1200 |
| Bursting strength kg:cm² | 2.6 | 2 | 1.0 |
| Breaking load (in kg) | | | |
| SM | 8 | 8.1 | 3 |
| ST | 4 | 4.3 | 1.8 |
| Breaking length (in meters) | | | |
| SM | 6020 | 6000 | 4800 |
| ST | 3010 | 3200 | 2400 |
| Tear index | | | |
| SM | 78 | 60 | 58 |
| ST | 73 | 63 | 59 |

Table II reflects the particularly advantageous qualities obtained by the process of the present invention, with respect to basic fibrous materials formed exclusively from pulp recycled from old papers.

It follows from the preceding description that, whatever the mode of implementation, embodiments and mode of application adopted, a process is obtained for continuously preparing fibrous material sheets containing in their mass latex and optionally a phenolic or amine resin, which process presents, with respect to previously known processes relating to the same purpose, important advantages such as the advantages of providing by a simple and economical method papers of excellent quality for numerous industrial uses, and more especially papers for abrasives in a dry or aqueous medium, support papers for adhesives, support papers for artifical leathers, support papers for book covers, papers for albums, papers for tearproof posters, advertising papers, papers for adhesive labels and for self-adhesives in general, support papers for metalization, support papers for washable wallpapers, papers for vacuum cleaner bags, papers for filtering, papers for books, documents, reviews subject to heavy and frequent handling, papers for manufacturing bank notes, papers for thermo-forming in general and all paper supports requiring high resistance to tearing, folding, wear, water, while retaining a very great flexibility as well as high mechanical strength.

Besides these advantages, two other very important advantages should be mentioned, namely:

the advantage of presenting a draining time of the fibrous mat on a sheet forming cloth of a paper-making machine less than 15 seconds and even, under certain conditions, between 4 and 10 seconds, the advantage of retaining all the latex used by complete linking onto the fibrous material used, thus ensuring total absence of latex particles in the draining water, thus avoiding any excess consumption of raw material and the whole problem of cleaning manufacturing circuits or pollution of the effluents of the factory.

II-EXAMPLES ACCORDING TO THE SECOND GENERAL PROCESS

EXAMPLE II-1

100 kg of dry paper-making sludges containing about 70 kg of mineral fillers (principally calcium carbonate) and about 30 kg of cellulose fibers are suspended in 5000 liters of water to provide a concentration of about 20 grams per liter. The pH is adjusted, if needed, to 7-7.2 and 0.02% of a urea-formaldehyde resin (based on the dry weight of the mixture), is added. If desired, a synthetic or natural dye may also be added. Next, 6% of a cationic linking agent (a low molecular weight diamide and formaldehyde condensate) with respect to the weight of the latex is added as a bridging agent.

Next, 30% by weight (based on the weight of the dry sludge) of latex ("Rhoplex P-339") is added after which a second quantity of the bridging agent (3.5% with respect to the weight of the dry latex) is added. After homogenization, 5%, based on the total weight of sludge and latex, of an internal sizing agent ("Aquapel" manufactured by Hercules) is added, then 0.4% (based on the total weight of sludge and latex) of a cationic starch which serves as a fixing agent for the "Aquapel".

The homogenized mixture is then fed to a conventional manufacturing circuit of a paper-making machine, such as shown in FIG. 1 and a sheet having the following characteristics is obtained:
  Weight per unit area: 405 g/m²
  Mullen index: 8.4
  Ash percentage: 70.2%
  AFNOR ink adhesion: 5/5
  Breaking length: 987 m
  latex: 23%

EXAMPLE II-2

The procedure of Example II-1 is repeated for the preparation of panels. The final composition of the mixture exclusive of bridging agent, is as follows:

Paper-making sludges: 20 parts
Cellulose fibers: 30 parts
Fine sawdust: 50 parts
Latex ("Rhoplex P-339") 50 parts
Phenolic resin: 10 parts This mixture is then pressed between two steel disks (30 to 40 kg/cm$^2$). The final drying is also carried out under pressure.

The panel thus obtained is coated, before use, on both faces with a plastic resin (e.g. "Aquafast" of A.T.C., an non-ionic acrylic/styrene latex containing as fillers TiO$_2$, talc, diatomaceous silica, and carbonate, 60% solids) and dried.

In general, panels formed in the molds can be formed under a pressure between 30 and 150 kg/cm$^2$.

EXAMPLE II-3

The procedure of Example II-1 is repeated using the following composition:
Paper-making sludge: 12%
Bleached resinous pulp: 18%
Fine sawdust: 30%
Acrylic latex ("Rhoplex"): 30%
Phenolic resin: 6%
Diamide-formaldehyde condensate bridging agent: 4%

EXAMPLE II-4

Example II-1 is repeated using the following composition:
Paper-making sludge: 10%
Bleached resinous pulp: 46%
Finely ground leather waste: 19%
Acrylic latex ("Rhoplex"): 23%
Diamide-formaldehyde condensate bridging agent: 2%

EXAMPLE II-5

Example II-1 is repeated using the following composition:
Paper-making sludge: 12%
Unbleached resinous pulp: 20%
Ground leather waste: 16%
Nylon fibers, length 13 mm: 16%
Acrylic latex ("Rhoplex") 32%
Diamide-formaldehyde condensate bridging agent: 4%

This general technique is particularly useful in preparing papers and panels for coating, insulating and packing, while using industrial waste.

III-EXAMPLES RELATING TO THE THIRD GENERAL PROCESS

EXAMPLE III-1A

There are placed into suspension 1200 kg of cellulose composed of 980 kg of bleached soda resinous cellulose fibers and 220 kg of bleached soda leafy cellulose fibers, in 30 cubic meters of water at pH 7.3 thereby providing a 4% concentration. The Zeta potential of the mixture is determined to be −7.8 (mv). Such measure has been made by a Zeta potential apparatus typ "Laser Zee Model 500 sold by Pen Kem N.Y. The pH of the fibrous suspension is adjusted to 4.8, which is the pH of the selected latex, by the addition of sulfuric acid. A solution of the selected bridging agent, consisting of a condensate of diamide with formaldehyde, is adjusted to a 3% solids solution and to a pH of 4.8; its Zeta potential is +13.7. Then, 14.5 liters of such 3% solution of the bridging agent are added to the pulp.

Next, 240 kg of the selected latex, consisting of acrylonitrile plus ethylacrylate ("Rhoplex P-339"), adjusted to a solids content of 10% using water at a pH of 4.8, the latex having a Zeta potential of −6.8, are added to the pulp. As the quantity of bridging agent initially added is on the low side, there is then added an additional quantity of 2.5 liters of the same solution. The Zeta potential of the furnish is then −7.8, the same as the Zeta potential of the starting pulp. This furnish, after dilution to a suitable paperforming consistency using water at a pH of 4.8, is ready for paper formation.

EXAMPLE III-1B

Example III-1A is repeated except that in the first addition of bridging agent there is instead used 17 liters of the 3% solution. No second addition of the bridging agent is thus necessary.

EXAMPLE III-2

There are put into suspension in 30 cubic meters of water, 840 kg of calcium carbonate having a Zeta potential of −7.2, and 340 kg of bleached soda resinous cellulose fibers having a Zeta potential of −16.1. The Zeta potential of the resultant slurry is −7.3. The pH of the suspension is adjusted to 7.5 by the addition of sodium hydroxide, this pH being the value of the selected polymer latex. Next there is added 21.5 liters of a solution of the bridging agent used in Example III-1 (alternatively, because the pH is close to neutral, there can be used as a bridging agent "Nadavine LT", cationic polyelectrolyte of Bayer comprising an aqueous solution of polyamide/polyamine epichlorohydrin resin, having a density of 1.06 g/cm$^3$ at 20° C.).

Next, after waiting a few minutes, there is then added 360 kg of styrene-butadiene latex stabilized at a pH of 7.5. The latex is added in the form of a 10% aqueous dispersion the Zeta potential of which is −11.3. Next, an additional 3.5 liters of the bridging agent are added, and the Zeta potential of the final mixture is approximately −7.3, the same as that of the starting slurry.

The furnish is then used to make paper, the latex content of which is approximately 23%. The properties of the paper are excellent, and it is seen that the paper is highly uniform and porous.

EXAMPLE III-3

In 30 cubic meters of water there is placed 1200 kg of cellulose fibers consisting of 980 kg of bleached soda resinous cellulose fibers and 220 kg of bleached soda leafy cellulose fibers, to produce a 4% concentration at a pH of 7.3, the Zeta potential of which is −7.8. The pH of the fibrous suspension is reduced to 4.8 with sulfuric acid so that the slurry will have the same pH as the latex to be subsequently added. Next, a bridging agent constituting a formaldehyde/diamide condensate at pH 4.7 is added in an amount of .7% solids based on the dry weight of the polymer in the latex to be subsequently added; as the bridging agent is diluted to 3% with water, 17 liters are accordingly added, the Zeta potential of the bridging agent solution being +13.7.

Next there is added the latex ("Rhoplex P-339") in an amount of 20% in relation to the dry weight of the fibers, or 240 kg diluted to 10% with water, having a pH of 4.8, the Zeta potential of the latex being −6.8. The Zeta potential of the resultant furnish is −7.8.

This furnish is used to make paper which is then sized in the sizing press with a composition of hydrolized polyvinyl alcohol (PVA-117h of Kuraray co, Ltd; 10% solids, Zeta potential of +7.4); chromium complex ("Quilon" of Dupont; 5% solids, Zeta potential +28.5); and Kaolin (5% solids, Zeta potential of −12.1), the total mixture having a Zeta potential of +12.2. As the mixture has a positive Zeta potential, it adheres very well to the paper support which has a negative Zeta potential.

EXAMPLE III-4

In 30 cubic meters of water there are placed 1200 kg of cellulose fibers (770 kg of bleached soda resinous cellulose fibers and 430 kg of bleached soda leafy cellulose fibers) to produce a 4% concentration at pH 7.3, the Zeta potential of which is −7.8. The pH is adjusted to 4.8 with sulfuric acid. Next, the same bridging agent used in Example III-3 is added in an amount of 3.5 liters (6% solids based on the amount of solid polymer in the latex to be added).

Next, the same latex used in Example III-3 is added in an amount of 5% based on the dry weight of the fibers (60 kg diluted to 10% with water at a pH of 4.8), the Zeta potential of which is −6.8. As the amount of bridging agent initially added is on the low side, next there is added an additional 0.6 liters of the bridging agent diluted to 3% with water (1% solids based on the dry weight of the polymer in the latex).

The resultant furnish having a Zeta potential of −7.8 is then used to make paper, such paper then being coated in the sizing press with an acrylic resin aqueous dispersion (2.5% solids) having a Zeta potential of +21.3.

EXAMPLE III-5

In 30 cubic meters of water is placed 1200 kg of fibrous material consisting of 720 kg of bleached soda resinous cellulose fibers having a Zeta potential of −16.1 and 480 kg of synthetic viscose fibers having a Zeta potential of −3.4. The slurry has a 4% concentration of fibers, a pH of 7.3 and a Zeta potential of −5.7. Its pH is then adjusted to 4.8 with sulfuric acid. The procedure of Example III-3 is followed using the same bridging agent (7% based on the weight of the solids in the latex) followed by addition of the latex, in this case 10% by weight solids based on the dry weight of the fibers (120 kg diluted to 10% with water). The Zeta potential of the final mixture is −5.7. Paper is made from this mixture and is then coated in the sizing press with a 5% solution of Quilon having a Zeta potential of +28.5.

EXAMPLE III-6

In 30 cubic meters of water there are placed 1200 kg of cellulose comprising 1080 kg of unbleached soda resinous cellulose fibers and 120 kg of unbleached soda leafy cellulose fibers. The resultant slurry has a 4% concentration, a pH of 7.3 and a Zeta potential of −10.3. Its pH is adjusted to 4.8 with sulfuric acid. As in Example III-3, 7% by weight of the diamide/formaldehyde condensate bridging agent based on the dry weight of the latex (25 liters diluted to 3% with water) is added. Then the latex ("Rhoplex P-339") is added in an amount of 30% by weight of solids relative to the dry weight of the fibers. The Zeta potential of the final furnish is −10.3. Paper formed from this furnish is coated in a sizing press with a mixture of Quilon (7% by weight solids) and hydrolized polyvinyl alcohol (7% by weight solids).

EXAMPLE III-7

In 30 cubic meters of water are placed 1200 kg of bleached soda resinous cellulose fibers to produce a 4% concentration having a pH of 7.3 and a Zeta potential of −16.1. The pH of the slurry is adjusted to 4.8 with sulfuric acid. Next a bridging agent (high molecular weight polyamine) having a pH of 13 is added in an amount (solids) of 3.6% based on the dry weight of the polymer in the latex (13.8 liters of a 1% solution at a pH of 7.3). Next the pH of the slurry is adjusted again to 4.8 with sulfuric acid, and the slurry at this point has a Zeta potential of approximately +7.6. Next the latex ("Rhoplex P-339") is added (32% solids relative to the dry weight of fibers, or 384 kg diluted to 10% with water at a pH of 4.8, Zeta potential of −6.8). The Zeta potential of the furnish is −16.

Paper formed from such furnish is then coated in the sizing press with a mixture of starch (5% by weight solids), kaolin (22.5% by weight solids), rutile titanium oxide (2.5% by weight solids), aqueous acrylic dispersion (5% by weight solids), urea-formaldehyde resin (0.3% by weight solids) and precipitated calcium stearate (0.5% by weight solids).

EXAMPLE III-8

In 30 cubic meters of water are placed 1200 kg of fibrous material constituting 900 kg of banana tree fibers (Zeta potential −7.8), 180 kg of synthetic nylon fibers (Zeta potential −0.1) and 120 kg of fibers from natural leather scrap (Zeta potential +6.6) to produce a 4% concentration having a pH of 7.3 and a Zeta potential of −7.3. The pH is adjusted to 4.8 with sulfuric acid. The bridging agent at pH 4.7 (diaminde/formaldehyde condensate) is added in an amount of 8% by weight based on the dry weight of the latex to be added. Next, "Rhoplex P-339" is added to provide 35% by weight of polymer particles relative to the dry weight of the fibrous mixture (220 kg diluted to 10% with water at pH 4.8). Then, an additonal 2% of bridging agent is added. The Zeta potential of the furnish is −7.2.

Paper made from such furnish is coated with a liquid containing 2% by weight hydralized polyvinyl alcohol solids and 8% by weight solids of "Quilon."

EXAMPLE III-9

Paper is made as disclosed in Example III-6. It is coated in the sizing press with a solution of Quilon (5% by weight solids).

EXAMPLE III-10

Paper is made as disclosed above in Example III-3. This paper is coated in the sizing press with an anionic polymer dispersion (20% by weight solids) having a Zeta potential of −14.7.

EXAMPLE III-11

In 30 cubic meters of water is placed 840 kg of calcium carbonate having a Zeta potential of −7.2 and 360 kg of bleached soda resinous cellulose fibers having a Zeta potential of −16.1, to produce a slurry having a 4% concentration, a pH of 7.3 and a Zeta potential of −7.3. The pH of the suspension is adjusted to 7.5 (of the pH of the latex to be added) with sodium hydroxide. Next the bridging agent (pH 4.7) is added (6% based on the dry weight of the polymer to be added, i.e. 21.5 liters diluted to 3% with water, at a pH of 7.3, after haivng adjusted the pH to 7.5 with dilute sodium hydroxide); the bridging agent used is the diamide/formaldehyde condensate at a Zeta potential of +13.7.

Next the polymer latex, a stryene-acrylic latex, is added in amount of 31% by weight solids based on the dry weight of the fibrous material (360 kg diluted to 10% with water at a pH of 7.5; Zeta potential of −11.3). Next an additional quantity of the bridging agent (1% in relation to the dry weight of the polymer in the latex, or 3.5 liters diluted to 3% with water at pH 7.3 to thereby bring the pH to 7.5, with dilute sodium hydroxide) is added. The Zeta potential of the furnish is −7.3.

Another syrene-butadiene latex which is suitably used is Dow 685 which is a carboxylated styrene/-butadiene latex stabilized at a pH of 5.0–6.5, sold in water at a concentration of 47%, the particle size being 140–160 nm. Where Dow 685 is used, then suitable adjustments are made in the process of Example III-11 so as to carry out the process at the stabilized pH of the latex.

EXAMPLE III-12

In 30 cubic meters of water are placed 1200 kg of bleached soda resinous cellulose fibers to produce a slurry of 4% concentration, pH 7.3 and Zeta potential −16.1. The pH is adjusted to 4.8 with sulfuric acid. A high molecular weight polyamine bridging agent (original pH 13) diluted with water and its pH adjusted with sulfuric acid to provide a pH of 4.8, 3% solids (7.2 liters) relative to the dry weight of the latex to be used, and having a Zeta potential of +7.6, is added to the pulp slurry. Next the latex is added (20% by weight solids relative to the dry weight of the fibers; 240 kg diluted to 10% with water to pH 4.8) having a Zeta potential −6.8. Then, an additional quantity of bridging agent (2.5 liters of the previously described solution) is added. Finally, a non-polymerizable phenolic resin (6% solids relative to the dry weight of the fibers) is added. The Zeta potential of the final mixture is −16.0.

EXAMPLE III-13

EXAMPLE III-12 is repeated except that a greater quantity of bridging agent and latex are used. In this case, 3% bridging agent (11.5 liters) is first added and then 32% latex solids based on the dry weight of the fibers (384 kg diluted to 10% with water). Lastly, 0.6% of additional bridging agent (2.3 liters diluted to 1%) is added. The Zeta potential of the final slurry is −16.

IV-Comparisons, elaborations and additional examples

The following Table 3 provides a comparison of the quantity of polymer or elastomer used according to the present invention to produce a particular type of paper, compared to the quantity of polymer or elastomer necessary according to the prior art impregnation technique to produce the same kind of paper.

TABLE 3

COMPARISON OF THE PERCENTAGES OF POLYMERS USED IN THE VARIOUS TECHNOLOGIES, AT THE SAME STAGES OF QUALITY AND FINISH

| FINAL USE | WEIGHT OF ELASTOMER DEPOSITED ON VIRGIN PAPER (Impregnation) | WEIGHT OF ELASTOMER LINKED TO FIBERS (Invention) |
|---|---|---|
| High strength paper | 40 to 60% | 20 to 25% |
| Leather substitute support | 30 to 50% | 20 to 30% |
| Synthetic paper nonwovens | 25 to 50% | 8 to 12% |
| Papers for adhesives | 70 to 100% | 25 to 35% |
| Papers for abrasives | 70 to 100% | 30 to 35% |
| Wallpapers | 25 to 40% | 5 to 8% |
| Floor coverings | 40 to 60% | 20 to 30% |
| Filtering papers | 10 to 80% | 5 to 20% |
| Papers for decorative laminates | 100 to 300% | 30 to 100% |

Percentages expressed in relation to the dry weight of the fibrous material or paper:
$$\frac{\text{Weight dry elastomer}}{\text{Weight dry fibrous material}}$$

Next, Table 4 below provides a general comparison showing the reduced number of processes steps necessary to produce various types of papers according to the invention, compared to the prior art impregnation technique now commonly in use.

TABLE 4

COMPARISON OF TECHNOLOGIES IN VARIOUS APPLICATIONS

| MATERIALS | PRESENT TECHNIQUES (Impregnation) | TECHNIQUES ACCORDING TO THE INVENTION |
|---|---|---|
| (1) HIGH STRENGTH PAPERS geographic maps, plans, regulations, posters, catalog covers, children's books, technical books, etc. | A. Bleached kraft<br>B. Latex impregnation<br>C. Printable, barrier layer pigmented on one face<br>3 OPERATIONS | A. Paper with linked latex in the mass with Size Press layer of 1 or 2 faces with a pigmented, printable barrier layer<br>1 OPERATION |
| (2) LEATHER SUBSTITUTE SUPPORTS book covers, valises, automobile, aircraft covers, seats, Various plasticized coverings, Belts, Footwear, luggage | A. Base support<br>B. Latex impregnation<br>C. Acrylic, PVC, urethane etc. layer<br>3 OPERATIONS | A. Paper with linked latex in mass<br>B. Size Press layer depending on use and nature of product to be covered (PVC excluded) |

TABLE 4-continued
COMPARISON OF TECHNOLOGIES
IN VARIOUS APPLICATIONS

| MATERIALS | PRESENT TECHNIQUES (Impregnation) | TECHNIQUES ACCORDING TO THE INVENTION |
|---|---|---|
| (3) NONWOVEN SYNTHETIC PAPERS<br>Medical adhesives,<br>Draperies,<br>Interior coverings,<br>raincoats | A. Semibleached kraft (at times done in 1 operation)<br>B. Latex impregnation and creping<br>C. Release layer<br>D. Neoprene barrier layer<br>E. Natural rubber adhesive layer<br>4 to 5 OPERATIONS | 2 OPERATIONS<br>A. Paper with latex linked in the mass and release layering in Size Press<br>B. Neoprene layer<br>C. Natural rubber adhesive layer<br>3 OPERATIONS |
| (4) PAPERS FOR FLAT OR CREPED ADHESIVES<br>Medical adhesives,<br>Masking tapes,<br>Industrial adhesives,<br>Hygiene adhesives (disposable),<br>Adhesive labels,<br>Self-adhesives | A. Bleached kraft<br>B. Latex impregnation (1 operation in some cases)<br>C. Barrier layer to solvents<br>D. Release layer (anti-adherent)<br>E. Adhesive layer<br>4 to 5 OPERATIONS | A. Paper with latex linked in the mass Barrier layer to solvents with high release properties<br>B. Adhesive layer<br>2 OPERATIONS |
| (5) PAPERS FOR ABRASIVES<br>Abrasives for car bodies,<br>Industrial abrasives,<br>Abrasives for polishing in an aqueous medium,<br>Abrasives in sheets, strips, disks in general | A. Unbleached kraft<br>B. Latex impregnation<br>C. Barrier layer 1 face<br>D. Abrasive layer with a base of phenolic resins on same face<br>E. Antislip layer on opposite face<br>5 OPERATIONS | A. Paper with linked latex in the mass with layers 1 face of barrier layer<br>B. Abrasive layer with base of phenolic resins on the same face as the barrier layer<br>C. Antislip layer on opposite face<br>3 OPERATIONS |
| (6) WALLPAPERS<br>Wall coverings strippable white, colored or printed<br>Wall coverings strippable and washable, white, colored or printed | A. Bleached kraft<br>B. Latex impregnation<br>C. Water barrier layer on 1 face<br>3 OPERATIONS | A. Paper with linked latex in the mass with layering one face or two if necessary of the water barrier layer<br>1 OPERATION |
| (7) FLOOR COVERINGS<br>Floor coverings coated and plasticized of all categories | A. Cardboard with a high % of mineral charges and asbestos<br>B. Latex impregnation<br>C. Vinyl or PVC layering depending on use on face used<br>3 OPERATIONS | A. Paper with linked latex in mass with high % of mineral charges without asbestos<br>B. Vinyl or PVC layerings depending on use of face used<br>2 OPERATIONS |
| (8) FILTER PAPERS<br>Water filtering<br>Coffee filtering<br>Oil filtering<br>Automobile filter<br>for: oil<br>air<br>fuel<br>gasoline<br>Gas filter<br>Filter papers for suction bags | A. Filter paper<br>B. Impregnation with latex or phenolic resins or mixture of both<br>2 OPERATIONS | A. Paper with linked latex in the mass and/or phenolic resins and/or special polymers depending on the final use<br>1 OPERATION |
| PAPERS FOR LAMINATES<br>Decorative laminates for funiture and various uses | A. Support paper<br>B. Very strong impregnation of latex with melamine resins<br>2 OPERATIONS | A. Paper with latex and melamines linked in the mass<br>1 OPERATION |

There are provided below a number of examples showing the manufacture of paper for various uses, which examples to some extent parallel those given above under part III. Again, these examples are illustrative only:

EXAMPLE IV-1

Paper products for flat or crepped adhesive supports for use in industrial, medical, construction, public works, hygiene products or as adhesive and selfsticking labels. Most adhesive tapes in use today use paper of basis weight between 60 and 120 g/m². However, if such tapes are made according to the invention for the manufacture of adhesive tapes in general, e.g. disposables, flat tapes, creped tape, masking tapes, surgical adhesives, medical adhesives for bandages, industrial adhesives for floor coverings, the weight ranges of the base paper can be expanded to between 20 and 300/m² or even more, depending on the paper-making equipment.

Materials corresponding to the same usage or to new uses as those indicated above, ready for application thereto of an adhesive layer and/or a release layer, can come directly from the paper machine in accordance with the invention, the paper already containing within its mass the core polymer or elastomer, linked in a homogeneous manner by way of the bridging agent. Such paper can then be provided with a treatment on one face giving it good resistance to organic solvents and water and good release properties, such treatment being provided at the size press location. The resultant paper then needs only one additional coating, i.e. application of the adhesive layer on the other face to constitute the final product. As pointed out above, suitable materials which can be applied at the size press location for providing an anti-adherent or release layer include hydrolyzed polyvinyl alcohol and complex chromium salts ("Quilon"), or mixtures thereof.

In one example, paper is made of 74% fibrous material, 22% elastomer ("Rhoplex P-339") and 0.4% bridging agent (diamide-formaldehyde condensate). Applied thereto at the size press is a composition of hydrolized polyvinyl alcohol (2%), Quilon (0.8%) and kaolin (0.8%).

This paper is used for the manufacture of creped masking tape for use in painting to mask parts that are not to receive paint from the paint spray gun.

A second paper identical to the first mentioned immediately above is instead coated with 3.6% by weight of an anionic polymer dispersion such as "Acronal 500D" of BASF. This product is used as a support for medical adhesives for use in fastening bandages.

A third product made of 53% cellulose fibers, 35% synthetic fibers, 10.5% (solids) of an acrylic elastomer latex (E940 of Rohm and Haas) and 0.3% of a bridging agent. It is coated with 1.2% by weight (based on the total dry weight of the final product of Quilon.

EXAMPLE IV-2

Products for industrial abrasive supports, such as for use in aqueous media for sanding automobile bodies, polishing metals, or for any abrasive support in the form of sheets, strips, disks.

Base papers currently in use for such products having basis weights between 30 and 200 g/m². In accordance with the invention, this range of basis weight can be broadened to and even beyond the range of 20–300 g/m².

According to the conventional impregnation techniques, the paper support consisting of unbleached kraft is impregnated with a styrene-butadiene latex. It is then coated on one face with a barrier layer and then passed to another machine where the barrier layer face is then coated with a layer of phenolic resin containing abrasive particles. The other side of the paper is then coated with an anti-slip layer. According to the invention, such process can be significantly improved by saving at least two operations for making the final product.

Thus, the paper is made according to the invention incorporating the latex within the interior linked by means of the bridging agent, and the solvent barrier layer can be applied directly on the paper machine at the size press location. Such a composition applied at the size press location to paper containing up to 50–55% latex suitably comprises a mixture of hydrolyzed polyvinyl alcohol and Quilon. In one example, paper is made consisting of 72% fibrous material, 22% elastomer ("Rhoplex P-339") and 0.4% bridging agent. To the formed paper there is then applied, at the size press location, a mixture of hydrolyzed polyvinyl alcohol and Quilon, each in the amount of 2.8% based on the total weight of the final dry product.

EXAMPLE IV-3

Weather and frequent handling resistent paper for use in the production of maps, plans, law books, posters, catalog covers, children's books, technical books, weather resistant placards.

Such papers are currently made starting with bleached kraft paper which is first impregnated with a synthetic elastomer, most often a styrene/butadiene polymer. In another machine, the so impregnated paper undergoes a pigmented layering on one face or on both faces making it easy to print. The prior technique requires relatively large consumption of energy in raw materials, and a high investment in equipment. Costs are reduced considerably according to the invention as the product is made directly on a paper machine, without any investment in additional equipment, and without energy cost greater than that needed for the manufacture of standard paper, and further while saving considerable quantities of polymer, copolymer of elastomer used. In the latter regard, the impregnation process uses a proportion of elastomers of around 40%, while making this type of paper according to the invention requires only 20–25% of elastomers (dry weight) relative to the weight of the final dried product, and this to obtain superior characteristics, both in resistance to various stresses and physical resistance.

By way of example, a paper is made for use in children's books containing 66.8% bleached resinous fibers, 21.3% of "Rhoplex P-339" and 0.5% of diamide-formaldehyde condensate bridging agent. This is then coated at the size press with a composition containing (percentage dry product based on the weight of the final dry product) 1.3% enzyme oxidized native starch, 6% kaolin, 0.6% titanium dioxide, 2.7% aqueous anionic acrylic dispersion ("Acronal 500D"), 0.3% ureaformaldehyde and 1.1% precipitated calcium stearate.

EXAMPLE IV-4

Leather substitute materials such as for book cover, suitcases, seat covers, interiors of autos, aircrafts and boats, plasticized coverings, belts, footwear, shingles, synthetic shoe soles.

Over the past number of years, various leather substitute materials have appeared essentially for economic reasons. Most of these materials do not have the nobility of leather but handle much more repetitive uses. The major drawback of the many encountered with the qualities of these various materials resides in the fact that such new products do not breathe like leather, in the sense that leather is a material which responds to changes in temperature and humidity. Such substitute products, now abundant in various specialized markets, are essentially produced by the present impregnation-saturation technique, in which the base paper goes through a bath of polymers or elastomers or a mixture thereof to give the resultant product considerable resistance to water, good flexibilty and resistance to most organic solvents. However, the product is not porous to air.

The base material is usually made from leather waste and cellulose or synthetic fibers and recovery fibers, these various materials being mixed together in suitable proportions corresponding to the final use of the manufactured product. The impregnation treatment having been completed, the resulting material generally in sheet form undergoes a second operation consisting in layering on one face therewith an acrylic, polyvinyl chloride, polyurethane, etc. coating, giving it a resistance and especially appearance very similar to that of leather. This latter layer is generally embossed or grained and dyed in various shades so that the final appearance thus treated has the appearance as close as possible to natural leather.

In making artificial leather, the process of the instant invention is particularly desirable, and the resultant product is much superior to the synthetic leather products presently available. Thus, the product is obtained directly on the paper-making machine as a continuous web with the polymer, co-polymer or elastomer linked to the organic or synthetic, animal and/or vegetable fibrous material in the aqueous medium. The resultant product exhibits homogeneity of structure and distribution of the polymer or elastomer that are remarkable, thus imparting mechanical and physical properties greatly superior to those of the prior art.

The product can then undergo, without breaking of the sheet, the desired surface treatment giving it the particular properties of chemical and mechanical resistance to friction and wear which are desired for the product. It is evident that the layer applied, desirably at the size press location 16 as shown in FIG. 1, can be dyed to the desired color, and after drying the product can then be subjected to embossing or graining, giving it the surface appearance of natural leather. It is to be noted that the materials according to the present invention have an extremely important advantage in relation to all existing substitute leathers, namely in the fact that the breathing of the material is retained as in natural leather. This means that these materials can breathe and thus react to temperature and humidity conditions just like natural leather, and they also lend themselves well to gluing, bending, preshaping and in general all the necessary stresses for making the articles and uses cited above, just like leather.

By way of non-limiting example, an artificial leather is made in accordance with the invention, without particular treatment of the surface thereof, for use in the luggage industry after coating with polyvinyl chloride, dying and graining. This base material is formed of 57% by weight exotic (banana plant) vegetable fibers, 11% by weight synthetic nylon fibers, 7.5% natural leather fibers from waste leather, 22.7% elastomer solids from "Rhoplex P-339" and 0.7% bridging agent. The product is coated at the size press with a mixture of hydrolized polyvinyl alcohol (0.2% by weight based on the weight of the final dry product) and "Quilon" chromium complex (0.9% based on the weight of the final dry product).

EXAMPLE IV-5

Non-woven products for use as medical adhesives, synthetic draperies including table clothes, napkins, hospital sheets, etc., linings of raincoats, sportswear, etc.

The manufacture of non-woven fabrics has been well known for many years. Very fast machines make non-woven fabrics by two main procedures, namely the wet process which is very similar to papermaking, and the dry process which, while using the principals of papermaking, resorts to electrostatic forming of the web. The resultant products are used mainly in medical adhesives, in camping articles (clothes, napkins, etc.) and are now made by a technique that consists in forming the sheet of fibrous material continuously, which is made up of half-bleached kraft, which sheet then receives an impregnation of latex or co-polymers to give it improved mechanical and water resistance. These non-woven fabrics are generally of a low weight, from 30 to 60 $g/m^2$.

In a typical prior art process, such as in the case of making a medical adhesive, the following procedure is carried out: after formation of the non-woven fabric, it is passed to a second machine where a release layer (anti-adherent layer) is applied to one face. The product is then passed to another machine where the same face which received the release layer, often a neoprene coating, then receives a layer of adhesive, generally with a natural rubber base. After drying, the product is completed and it then needs only to be transformed by cutting, rolling, etc. prior to delivery to the user.

Such a product can be made in a superior way according to the invention because the internal elastomer or polymer is applied during formation and the anti-adherent or release layer applied at the size press position. It is also possible, by additional equipment to be incorporated into the machine, to also put a second barrier layer on the other face, having a neoprene base or the like. All that is required to obtain the final product is to apply on the same barrier face the desired adhesive layer, e.g. with the base of neoprene or other polymer, applied separately on a coating machine.

It should be noted that the materials made according to this invention give the product very superior final properties using strikingly smaller amounts of elastomer or polymer. Actually, in the impregnation technique now used, it is necessary to use between 15 and 25% by weight of elastomer by relative to the dry weight of the final product, whereas the product made according to the invention by linking of the elastomer or polymer on the fibrous raw material in the aqueous medium requires only 8-12% by weight of polymer in relation to the total dry weight of the final product. Therefore, there is a considerable saving of material coupled with the fact that energy savings are also made, consequently at a lower cost because of the reduction of the number of machines necessary to make the final product.

As a non-limiting example, a non-woven fabric is made for an adhesive bandage from 53% vegetable fibers, 35% synthetic fibers, 10.5% solids of a mixture of lattices (50% "Rhoplex P-339" and 50% "Rhoplex HA-24"), and 0.3% bridging agent. To this there is applied at the size press "Quilon" chromium complex in an amount of 1.2% based on the dry final product.

EXAMPLE IV-6

New products for stripable unwashable wall coverings.

The need presently exists for a wall covering material which is easily stripable when it is desired to be replaced, without damaging the underlying plaster or drywall. In contrast to standard wallpaper, such materials offer the advantage of resisting a wet sponge or washing, on the one hand, and are perfectly detachable, after some years, without damaging the wall or the plaster on which they have been pasted.

Prior techniques for making such wall coverings involve manufacturing a bleached kraft, impregnating the kraft by passing it through an impregnation machine comprising a tank in which the paper is immersed in and absorbs a mixture in an aqueous medium of polymers, co-polymers or elastomers, usually styrene-butadiene latex. On leaving this impregnation bath and after drying, the paper sheet is brought to another machine where it undergoes coating with a barrier layer on only one face which, after drying, has considerable water resistance. The paper product is then rolled and delivered in reels to transformers and decorators who apply the desired designs and, in some cases, paste to one side thereof.

Such a product is made according to the invention by forming a paper base containing 5-8% by weight latex (dry) relative to the weight of the dry product. This provides a considerable saving in material, as according to the prior techniques one must use 12-20% of polymer or elastomer. By way of a example, such a wallpaper base product is made in accordance with the present invention comprising 92% by weight of bleached resinous cellulose fibers, 7.4% by weight elastomer (Dow 685 carboxylated styrene/butadiene latex) and 0.2% of bridging agent. The product is coated at the size press with an aqueous acrylic dispersion ("Ukadur 9531" by Schill and Seilacher Co.) in an amount (solids) of 0.4% based on the total dry weight of the product.

EXAMPLE IV-7 MATERIALS FOR VARIOUS FLOOR COVERINGS

Supports for floor coverings are made from cardboard (paper board) very often formed of recycled fibers and containing a high percentage of mineral filler and, in some countries, asbestos fibers. The thus prepared support can undergo two different types of treatment, i.e. either an impregnation by immersion in a bath containing an elastomer, or a coagulation precipitation of the latex on the fibers upstream of the paper formation. Both these prior techniques have major drawbacks. The technique of impregnation greatly increases the cost, since the necessary elastomer proportions are great and this treatment requires an additional machine and additional energy cost.

The technique utilizing precipitation-coagulation in the mass, although clearly more economical, has numerous drawbacks which are caused by the need to make considerable modifications of the paperboard machine before it can be used, lack of effective control of the coagulation-precipitation reaction on the fibrous and mineral material, and extremely high rate of clogging and pollution, a lack of reliability and regularity not only in the process but also in the quality of the fabricated material.

The product made according to the present invention eliminates the various drawbacks of the prior art. In comparison with the impregnation technique, the materials made according to the invention show a saving of material, since only 20-30% (dry weight) of elastomer in relation to the weight of the final dry product are necessary as compared with 40-60% in the impregnation technique. Moreover, linking in the aqueous medium according to the invention avoids a later transformation stage, since the product coming directly from the paperboard machine comprises elastomer linked to the fibers in a perfectly homogeneous way.

In comparison with the precipitation-coagulation technique, the materials made according to the invention give reliability, regularity and homogeneity in the manufacturing process and in the quality of the material produced with results cannot be equalled in the precipitation-coagulation procedure. According to the technique of the invention, wherein the pH and Zeta potentials are controlled so that the precise amount of bridging agent is used necessary to link all the latex particles to the fibers without causing coagulation or precipitation of the latex, the attachment of the polymer, co-polymer or elastomer is total and there is thus guaranteed an absolute absence of pollution of effluents and a perfect and constant reproducability on a standard paperboard machine that has not undergone any modification in its structure or its circuits.

By way of example, a paperboard support is produced according to the invention which is suitable for use in the manufacture of flooring material by the application thereto of vinyl resin or other polymer, dependent on the precise nature of the final product. This support material comprises 19.5% resin fibers, 62% mineral particles (carbonates), 18.4% elastomer (applied in the form of a latex) and 0.6% bridging agent.

EXAMPLE IV-8 FILTER MATERIAL FOR INDUSTRIAL, FOOD, HOUSEHOLD USES

Porous filter paper can be made according to the invention for a great variety of uses, including for the filtering of water, coffee, oil, air; for the filtering of materials in conjunction with industrial or automotive equipment including the filtering of oil, air, fuel, gasoline, kerosene, air and other gases; and for filtering dust from air such as in air conditioning circuits for buildings, and vacuum cleaner bags and industrial aspirators.

According to the prior art, such papers are made by first forming the paper, then impregnating the paper either in the aqueous medium or in a solvent medium using polymers or co-polymers or elastomer or a mixture thereof on an extremely bulky and absorbent fibrous support, for which the impregnation constitutes a considerable and necessary improvement of the intrinsic physical characteristics of the support, such as with respect to properties of resistance to aging and hot oil in the case of automobile oil filters, for example. A major drawback of this technique is the need to have an impregnation line distinct from the machine making the base support, and the obligation to apply a relatively large amount of polymer, co-polymer or elastomer which varies from 10 to 40% by weight (dry) of the total dry weight of the final product. Moreover, when impregnation is effected in a solvent medium, there are additional cost in environmental problems, the latter of which require solutions which add even further to the cost.

As with other products made according to the invention, the polymer, co-polymer or elastomer is linked to the fibrous material in the aqueous medium using a bridging agent to link fine latex particles to the fibers in order to obtain a very homogeneous final product which retains great porosity. This process makes it possible to obtain directly at the exit of the paper-making machine a finished material exhibiting exceptional physical qualities and a resistance to aging and hot oil (150° C. in the case of oils for vehicles) that is remarkable and very much superior to the resistances obtained by product made by the impregnation method. Further, the cost of the materials made according to the invention is reduced considerably by the fact that a later impregnation is avoided and the fact that a considerable savings of material is achieved.

By way of non-limiting example, a filter paper designed for engine oil filters for auto vehicles, is made according to the invention of 86.3% bleached resin fibers, 8.6% elastomer ("Rhoplex P-339" latex), 4.3% non-polymerizable phenolic resin and 0.8% bridging agent.

Other filter paper is made of vacuum cleaner bags, comprising 91.1% vegetable fibers, 8.5% elastomer ("Rhoplex P-339") and 0.4% bridging agent.

It is understood that the invention is not limited to the embodiments disclosed which are illustratively offered and that modifications may be made without departing from the invention.

What is claimed is:

1. A method for the continuous manufacture of fibrous paper sheet material from an aqueous fibrous pulp containing at least 7% latex solids comprising the following steps:
   (1) providing water which contains no more than abut 22 mg/l of chlorine, no more than about 46 mg/l of sulfate, no more than about 0.2 mg/l of sulfamate and no more than about 0.2 mg/l of aluminum,
   (2) suspending fibrous material having an anionic charge in said water,
   (3) measuring the pH and the Zeta potential of said fibrous suspension,
   (4) adding to said fibrous suspension a compound which will alter the pH of said fibrous suspension, to adjust the pH of said fibrous suspension to the pH value of the aqueous suspension of latex particles to be added later, the nature and amount of said compound which will alter the pH being such that the suspension will continue to contain no more than about 22 mg/l of chlorine, no more than about 46 mg/l of sulfate, no more than about 0.2 mg/l of sulfamate and no more than about 0.2 mg/l of aluminum,
   (5) providing an aqueous solution comprising as bridging agent a condensate of diamide and formaldehyde having the formula:

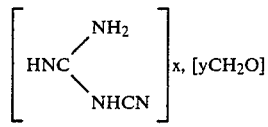

the ratio x/y being between 0.1 and 3, the molecular weight being between 400 and 1500, and adjusting the Zeta potential of said agueous solution to an absolute value between 60–120% of that of the fibrous suspension and the latex suspension, said adjusting of the Zeta potential being effected by controlling the quantity of said condensate in said aqueous solution,
   (6) adjusting the pH of said bridging agent solution to that of the aqueous suspension of latex and the fibrous suspension,
   (7) adding the latex suspension to the fibrous suspension in an amount to provide, in the final paper product, at least 7% latex solids,
   (8) adding the bridging agent solution to the obtained mixture of latex and fibrous suspension in a quantity such that the obtained mixture has a Zeta potential substantially equal to that of the aqueous starting fibrous suspension and the latex particles remain generally unflocculated, and
   (9) forming a paper sheet from the resultant mixture.

2. A method according to claim 1, wherein said bridging agent has a ratio x/y of 0.7 to 1.7.

3. A method according to claim 1, wherein said bridging agent has a molecular weight between 1000 and 1100.

4. A method according to claim 2, wherein said bridging agent has a molecular weight between 1000 and 1100.

5. A method according to claim 1, further adding at least one of a mineral filler and an organic filler is added to said fibrous suspension.

6. A method according to claim 5, wherein said at least one of said mineral filler and said organic filler is selected from the group consisting of calcium carbonate; magnesium carbonate; kaolin; talc; titanium oxide; gypsum; natural ochres; silico-aluminates; asbestos; aminoplasts; phenoplasts; leather waste; saw dust.

* * * * *